(12) United States Patent
Cavness et al.

(10) Patent No.: US 12,095,269 B2
(45) Date of Patent: Sep. 17, 2024

(54) SYSTEMS AND METHODS FOR GENERATING AND CONSUMING POWER FROM NATURAL GAS

(71) Applicant: Crusoe Energy System LLC, Denver, CO (US)

(72) Inventors: Charles Cavness, Saint Cloud (FR); Chase Lochmiller, Castle Rock, CO (US); Kenneth Parker, Denver, CO (US)

(73) Assignee: Crusoe Energy Systems LLC, Denver, CO (US)

( * ) Notice: Subject to any disclaimer, the term of this patent is extended or adjusted under 35 U.S.C. 154(b) by 0 days.

(21) Appl. No.: 18/376,336

(22) Filed: Oct. 3, 2023

(65) Prior Publication Data

US 2024/0063641 A1    Feb. 22, 2024

Related U.S. Application Data

(63) Continuation of application No. 17/865,331, filed on Jul. 14, 2022, now abandoned, which is a
(Continued)

(51) Int. Cl.
*H02J 3/38* (2006.01)
*C10L 3/10* (2006.01)
(Continued)

(52) U.S. Cl.
CPC ............... *H02J 3/38* (2013.01); *C10L 3/104* (2013.01); *E21B 43/16* (2013.01); *G06Q 20/065* (2013.01);
(Continued)

(58) Field of Classification Search
CPC ...... H02J 3/001; H02J 3/0012; H02J 2300/10; H02J 3/40; H02J 3/38; H02J 3/381;
(Continued)

(56) References Cited

U.S. PATENT DOCUMENTS 6,161,386 A    12/2000  Lokhandwala
6,521,020 B2    2/2003  Butwell
(Continued)

FOREIGN PATENT DOCUMENTS

CA        2522428 C      9/2008
CN     101501596 A      8/2009
(Continued)

OTHER PUBLICATIONS

European Search Report issue for EP19844275.8, Dated May 12, 2021, 8 pages.
(Continued)

*Primary Examiner* — Carlos Amaya
(74) *Attorney, Agent, or Firm* — Davidson Kappel LLC

(57) ABSTRACT

Systems and methods are provided to mitigate flaring of natural gas. A natural gas processing system may process raw natural gas into a fuel gas stream that may be used to power any number of on-site power generation modules. In turn, the power generation modules may convert the fuel gas stream into an electrical output, which may be employed to power any number of distributed computing units housed within one or more mobile data centers. In certain embodiments, the distributed computing units may be adapted to mine cryptocurrency or perform other distributed computing tasks to generate revenue.

31 Claims, 6 Drawing Sheets

Related U.S. Application Data continuation of application No. 17/087,928, filed on Nov. 3, 2020, now Pat. No. 11,418,037, which is a continuation of application No. 16/694,883, filed on Nov. 25, 2019, now Pat. No. 10,862,309, which is a continuation of application No. 16/529,152, filed on Aug. 1, 2019, now Pat. No. 10,862,307.

(60) Provisional application No. 62/713,368, filed on Aug. 1, 2018.

(51) Int. Cl.
  *E21B 43/16*   (2006.01)
  *G06Q 20/06*   (2012.01)
  *H02J 3/00*    (2006.01)
  *H02J 3/40*    (2006.01)

(52) U.S. Cl.
  CPC ............ *H02J 3/001* (2020.01); *H02J 3/0012* (2020.01); *H02J 3/381* (2013.01); *H02J 3/40* (2013.01); *G06Q 2220/00* (2013.01); *H02J 2300/10* (2020.01)

(58) Field of Classification Search
  CPC ....... C10L 3/104; E21B 43/16; G06Q 20/065; G06Q 2220/00
  See application file for complete search history.

(56) References Cited

U.S. PATENT DOCUMENTS

| | | |
|---|---|---|
| 7,396,388 B2 | 7/2008 | Mitariten |
| 7,998,227 B2 | 8/2011 | Mittricker |
| 8,070,863 B2 | 12/2011 | Tsangaris et al. |
| 8,467,050 B2 | 6/2013 | Dutel |
| 9,337,704 B1 | 5/2016 | Leslie et al. |
| 9,394,770 B2 | 7/2016 | Boot et al. |
| 9,637,433 B2 | 5/2017 | Zubrin et al. |
| 9,673,632 B1 | 6/2017 | Ramesh et al. |
| 9,719,024 B2 | 8/2017 | Young et al. |
| 10,013,037 B1 | 7/2018 | Clidaras et al. |
| 10,444,818 B1 | 10/2019 | McNamara et al. |
| 10,873,211 B2 | 12/2020 | McNamara et al. |
| 11,016,456 B2 | 5/2021 | Henson et al. |
| 11,016,553 B2 | 5/2021 | McNamara et al. |
| 11,025,060 B2 | 6/2021 | McNamara et al. |
| 11,031,813 B2 | 6/2021 | McNamara et al. |
| 2005/0200205 A1 | 9/2005 | Wynn et al. |
| 2007/0278860 A1 | 12/2007 | Krieger et al. |
| 2010/0038907 A1 | 2/2010 | Hunt et al. |
| 2011/0115425 A1 | 5/2011 | Olsson |
| 2013/0190936 A1 | 7/2013 | Belady et al. |
| 2014/0096837 A1 | 4/2014 | Belady et al. |
| 2014/0372772 A1 | 12/2014 | McKnight et al. |
| 2015/0167550 A1 | 6/2015 | Vandervot et al. |
| 2015/0368566 A1 | 12/2015 | Young |
| 2016/0125040 A1 | 5/2016 | Kheterpal et al. |
| 2017/0218843 A1 | 8/2017 | Oehring et al. |
| 2017/0271701 A1 | 9/2017 | Berlowitz et al. |
| 2018/0109112 A1 | 4/2018 | Paine et al. |
| 2018/0109541 A1 | 4/2018 | Gleichauf |
| 2019/0022580 A1 | 1/2019 | Al Muhsen |
| 2019/0063252 A1 | 2/2019 | Spears |
| 2020/0006938 A1 | 1/2020 | Torvund |
| 2020/0051184 A1 | 2/2020 | Barbour |
| 2020/0359572 A1 | 11/2020 | Henson et al. |

FOREIGN PATENT DOCUMENTS

| | | |
|---|---|---|
| EP | 3035480 A1 | 6/2016 |
| WO | WO2013022501 A1 | 2/2013 |
| WO | WO2015072989 A1 | 5/2015 |
| WO | WO2015123257 A1 | 8/2015 |

OTHER PUBLICATIONS

International Search Report and Written Opinion issued for PCT/US2019/44646, dated Oct. 11, 2019, 8pp.

Bellusci, Michael: Why waste all that cheap Permian gas? Make some bitcoins with it, Apr. 2018, accessed Aug. 16, 2019 at htts://www.dallasnews.com/business/energy/2018/04/13instead-flaring-cheap-permian-natural-gas-could-used-power-bitcoin-mining-rigs.

BitFury Group Limited. BlockBox AC—Air Cooled Mobile Datacenter. Amsterdam, The Netherlands: BitFury, 2017.

BTU Analytics, Bitcoin to BTUs: Cryptocurrency Impact On Natural Gas, Jan. 3, 2018, accessed Aug. 16, 2019 at https://btuanalytics.com/cryptocurrency-bitcoin-natural-gas/.

CryptoKube Industrial Mining Solutions, The Wayback Machine, https://web.archive.org/web/20160305044934/http://www.cryptokube.com:80/home/4586398583, dated Mar. 5, 2016.

CryptoKube Bitcoin Mining Data Center Tour, KubeData Systems Inc.—Mobile and Modular Data Canter, CryptoKube Video Screenshot.pdf (p. 1).

CryptoKube Tour Transcript, pp. 1-21, Dec. 18, 2014.

Emmanuel, Ogwu Osaemezu: Texas Oil Producers Could Channel Excess Gas into Bitcoin Mining Operations, Apr. 21, 2018,BTC Manager, accessed Aug. 16, 2019 at https://btcmanager.com/texas-oil-producers-could-channel-excess -gas-into-bitcoin-mining-operations/.

Kaplan, Steven: Wiley Electrical and Electronics Engineering Dictionary, 2004, pp. 1-3.

Lielacher, Alex: "Crypto You Can Mine From a Home Computer in 2023", Jul. 18, 2023, p. 1-11.

O'Dwyer et al.: "Bitcoin Mining and its Energy Footprint", Hamilton Institute National University of Ireland Maynooth, ISSC 2014 / CHCT 2014, Limerick, Jun. 24-27, pp. 1-6.

Opto Video transcript for "Why is Natural Gas Flared?" Temecula, CA: Opto Video, Jun. 23, 2015, accessed at https://www.youtube.com/watch?v=QvCL-irl1Rs on Jan. 19, 2024.

PGR2023-00039: Petition for Post-Grant Review PGR2023-00039 of U.S. Pat. No. 11,574,372 Pursuant to 37 C.F.R. § 42.200 et seq., pp. 1-138, filed Jul. 20, 2023.

PGR2023-00039: Declaration and Curriculum Vitae of Michael Nikolaou: "Blockchain Mine at Oil or Gas Facility", pp. 1-157 from Petition for Post-Grant Review of U.S. Pat. No. 11,574,372, filed Jul. 20, 2023.

PGR2023-00039: Declaration and Curriculum Vitae of Vernon Kasdorf: "Blockchain Mine at Oil or Gas Facility", pp. 1-116 from Petition for Post-Grant Review PGR2023-00039 of U.S. Pat. No. 11,574,372, filed Jul. 20, 2023.

PGR2023-00039: Declaration of June Ann Munford, pp. 1-225 from Petition for Post-Grant Review of U.S. Pat. No. 11,574,372, filed Jul. 20, 2023.

PGR2023-00039: Patent Owner Response to Petition for Post-Grant Review PGR2023-00039 of U.S. Pat. No. 11,574,372, filed Oct. 24, 2023.

PGR2023-00039: Declaration of Fengqi You, pp. 1-222 from Patent Owner Response for Post-Grant Review of U.S. Pat. No. 11,574,372, filed Oct. 24, 2023.

PGR2023-00039: Declaration of Sylvia Hall-Ellis, pp. 1-222 from Patent Owner Response for Post-Grant Review of U.S. Pat. No. 11,574,372, filed Oct. 24, 2023.

PGR2023-00039: Petitioner's Reply to Patent Owner's Preliminary Response for Post-Grant Review of U.S. Pat. No. 11,574,372, filed Nov. 22, 2023.

PGR2023-00039: Patent Owner's Sur-Reply to Petitioner's Reply to Patent Owner's Preliminary Response for Post-Grant Review of U.S. Pat. No. 11,574,372, filed Nov. 22, 2023.

PGR2023-00052: Petition for Post-Grant Review PGR2023-00039 of U.S. Pat. No. 11,574,372 Pursuant to 37 C.F.R. § 42.200 et seq., pp. 1-138, filed Sep. 23, 2023.

PGR2023-00052: Second Declaration of Vernon Kasdorf, "Blockchain Mine at Oil or Gas Facility", pp. 1-37 from Petition for Post-Grant Review of U.S. Pat. No. 11,574,372, filed Sep. 23, 2023.

(56) References Cited

OTHER PUBLICATIONS

PGR2023-00052: Patent Owner Response to Petition for Post-Grant Review PGR2023-00039 of U.S. Pat. No. 11,574,372, filed Jan. 3, 2024.

PGR2023-00052: Declaration of Fengqi You from Patent Owner Response for Post-Grant Review of U.S. Pat. No. 11,574,372, filed Jan. 3, 2024.

Polivka GmbH: "Mining Container Bitcointalk Forum Post", The Wayback Machine—https://web.archive.org/web/20150520015416/https://bitcointalk.org/index.php?topic=948523.0;all, May 20, 2015 pp. 1-36.

Polivka Mining Container Setup Screenshot, p. 1, 2015.

Radatz, Jane: "The IEEE Standard Dictionary of Electrical and Electronics Terms Sixth Edition", pp. 1-4, 1997.

Reddit: "Mining with Free Natural Gas", dated Jul. 3, 2016. https://www.reddit.com/r/Bitcoin/comments/4r2bjm/mining_with_free_natu ral_gas/.

Sanders, Gerald "Gas Conversion Systems Reclaim Fuel for Industry", Energy and Environment, Spinoff 2015, pp. 1-4.

Shaan, Ray: Cryptocurrency Strategies for Power and Energy Companies, Oct. 15, 2017, Medium, accessed Aug. 16, 2019 at https://techbust.io/cryptocurrency-strategies-for-power-and-energy-companies-198d0188e7da.

Szmigielski, Albert: "Bitcoin Essential: Gain Insights into Bitcoin, a cryptocurrency and a powerful technology, to optimize your Bitcoin mining techniques", Packt Publishling, 2016, pp. 1-130.

Vedvik, Richard: "When and how to Design Parallel Generators" Jun. 21, 2018, pp. 1-8.

Weiran et al., "Natural Gas Distributed Energy in Data Centers Applied Research in Energy Supply," Energy Conservation, doi : 103969/j, issn. 1004-7948, Feb. 2014 (with computer translation).

Wilmoth, Josiah: Pipe Dream: Analyst Mull Natural Gas-Powered Bitcoin Mining Operation, Apr. 16, 2018, CCN, accessed Aug. 16, 2019 at https://www.ccn.com/pipe-dream-analyst-mull-natural-gas-powered-bitcoin-mining-operation/.

Yin et al., "Application Research of Natural Gas Distributed Energy System in Large Data Center," Energy Construction, Planning & Consulting, 2015, vol. 2, No. 2 (with computer translation).

York, Larrie: Generator Rating Explained, Frontier Power Products, accessed Aug. 16, 2019 at http://frontierpower.com/wp-content/uploads/2016/01/Generator-Ratings -Explained-by-LARRIE-York.pdf.

SYSTEMS AND METHODS FOR GENERATING AND CONSUMING POWER FROM NATURAL GAS

CROSS-REFERENCE TO RELATED APPLICATIONS

The present application is a continuation application of U.S. utility patent application Ser. No. 17/865,331, titled "Systems and Methods for Generating and Consuming Power from Natural Gas," filed Jul. 14, 2022, which is a continuation application of U.S. utility patent application Ser. No. 17/087,928, titled "Systems and Methods for Generating and Consuming Power from Natural Gas," filed Nov. 3, 2020, which is a continuation application of U.S. utility patent application Ser. No. 16/694,883, titled "Systems and Methods for Generating and Consuming Power from Natural Gas," filed Nov. 25, 2019, which is a continuation application of U.S. utility patent application Ser. No. 16/529,152, titled "Systems and Methods for Generating and Consuming Power from Natural Gas," filed Aug. 1, 2019, which claims benefit of U.S. provisional patent application No. 62/713,368, titled "Systems and Methods for Generating and Consuming Power from Natural Gas," filed Aug. 1, 2018. Each of the above applications is incorporated by reference herein in its entirety.

BACKGROUND

This specification relates to enabling the utilization of raw natural gas, such as flare gas, stranded gas, and associated gas for power generation. More specifically, the specification relates to on-site generation of electricity from natural gas to power modular processing units adapted to perform distributed computing tasks.

Extracting oil from unconventional resources, such as shale gas formations, through the combination of horizontal drilling and hydraulic fracturing has increased at a rapid pace in recent years. The Bakken, Powder River Basin, Denver Julesburg ("D-J") Basin, North Park Basin, and Permian Basin are just some of the important "plays" in the United States. A "play" is the geographic area underlain by a gas- or oil-containing geologic formation.

Development of these gas plays and other unconventional resources presents significant potential for economic development and energy independence, but also presents the potential for environmental impacts on land, water and air. For example, although oil production represents the most important source of revenue for a given well, most wells also produce natural gas as a low-value byproduct. Unfortunately, the liquids-rich natural gas byproduct often cannot be economically transported by trucks or trains from remote well locations. Although such natural gases could be transported via pipelines, many oil and natural gas wells are located beyond the reach of such infrastructure. Absent gas pipeline infrastructure, oil well operators must either "vent" or "flare" produced gasses for safety reasons. Venting is the controlled release of natural gases into the atmosphere in the course of oil and gas production operations, however natural gas accumulations around the wellbore create significant safety hazards. Flaring is the controlled burning of natural gas produced in association with oil in the course of routine oil and gas production operations, and is designed to minimize the safety and environmental risks associated with venting uncombusted natural gas.

As of April 2016, the NOAA estimates that there are over 6,200 individual flares in the United States, which burn about 35 billion ft$^3$ of natural gas annually—enough to supply about 6 million homes. Such large-scale flaring of natural gas has raised serious environmental and health concerns and various state and federal regulators have begun to take action by implementing strict regulations and enforcement policies. For example, Colorado generally limits flaring to 60 days and many new well permits require producers to have a natural gas offtake solution prior to production; North Dakota has recently implemented a requirement that 90% of associated gas be captured by 2020; and Texas only allows new wells to flare for 10 days before an additional 45-day permit must be obtained. The EPA has also implemented flaring regulations where sites that exceed 100 tons per year of VOC, CO or NOX trigger Title V "Major Source Emitter" rules. Violations of state or federal rules can result in oil wells being "shut in," rejected permits and/or significant cash fines.

Stranded natural gas, particularly in the case where liquids-weighted wells are shut in due to gas takeaway constraints, represents a very low-cost power generation opportunity. Stranded gas exists across most prominent shale fields today including in the D-J Basin, Permian Basin, Bakken, SCOOP/STACK, etc. Many oil and gas operators in pipeline-constrained environments readily offer their natural gas for low cost—even at a loss to the operator in some cases-so that they can produce oil, which often represents the vast majority of a well's lifetime economics.

One potential solution to the natural gas problem lies in distributed computing. Cryptocurrency is a booming asset class with the combined market capitalization of digital currencies surpassing $380 billion in July 2018. Cryptocurrencies operate on a distributed system of computers "mining" the currencies—essentially processing the underlying algorithms to continuously verify transactions and account balances. The crypto mining process is a significant industry in its own right, projected to reach a value of $39 billion by 2025 with a projected CAGR of 29.7%.

This high-growth industry requires innovative and inexpensive electricity sources as it requires enormous amounts of power—approximately 29 TWh of electricity per year on a global basis. For perspective, cryptocurrency mining consumes more power annually than 159 countries, including Hungary, Ireland, Nigeria or Slovakia. Indeed, electricity is typically the single largest lifetime cost to a cryptocurrency mining operation, with power costs offsetting approximately 30% of total mining revenues in the US.

Accordingly, there remains a need for systems and methods for generating electricity from natural gas produced from oil wells. It would be beneficial if such electricity could be produced and consumed on-site, for example, by using it to operate power-intensive, modular processing units. It would be further beneficial if such processing units could be employed to mine cryptocurrency or perform other distributed computing tasks to generate additional revenue.

SUMMARY

In accordance with the foregoing objectives and others, exemplary systems and methods are disclosed herein to convert raw natural gas into a fuel gas stream that may be used to power any number of on-site power generation modules. In turn, the power generation modules may convert the fuel gas stream into electricity, which may be employed to power any number of modular distributed computing units. In certain embodiments, the distributed computing units may be adapted to mine cryptocurrency or perform other distributed computing tasks to generate revenue.

In one embodiment, a flare mitigation system is provided. Such system may include an electrical power generation system, which may include a power generation module adapted to: receive a fuel gas stream, such as a fuel gas associated with a heat value of at least about 1,000 Btu/scf, and consume the fuel gas stream to generate a high-voltage electrical output associated with a first voltage. The electrical power generation system may also include an electrical transformation module in electrical communication with the power generation module, the electrical transformation module adapted to: receive the high-voltage electrical output generated by the power generation module; and transform the high-voltage electrical output into a low-voltage electrical output associated with a second voltage that is lower than the first voltage.

The flare mitigation system may also include a distributed computing system powered by the electrical power generation system. The distributed computing system may include a communications system with one or more data satellite antennas in order to provide a network; and a first mobile data center. The mobile data center may include an enclosure defining an interior space; a plurality of distributed computing units located within the interior space of the enclosure, each of the plurality of distributed computing units in communication with the network; and a power system located at least partially within the interior space of the enclosure, the power system in electrical communication with the electrical transformation module and the plurality of distributed computing units such that the power system receives the low-voltage electrical output and powers each of the plurality of distributed computing units.

In some cases, the power generation module may be an engine-type generator that generates a high-voltage electrical output of from about 70 kW to about 2 MW (e.g., from about 70 kW to about 300 kW, from about 300 kW to about 400 kW, 400 kW to about 1 MW, or from about 1 MW to about 2 MW). The first voltage of the high-voltage electrical output may be from about 480 V to about 4.16 kV. And the second voltage of the low-voltage electrical output may be from about 208 V to about 240 V.

In other cases, the power generation module may be a turbine-type generator that generates a high-voltage electrical output of from about 2 MW to about 30 MW. In such cases, the first voltage of the high-voltage electrical output may be from about 4.16 kV to about 12 kV. And the second voltage of the low-voltage electrical output may be from about 208 V to about 240 V.

In another embodiment, a flare mitigation system is provided. The system may include an electrical power generation system having a first power generation module and a second power generation module. The first power generation module may be adapted to receive a first fuel gas stream, such as a fuel gas associated with a heat value of at least about 1,000 Btu/scf, and to consume the fuel gas stream to generate a first high-voltage electrical output associated with a first voltage. The second power generation module may be adapted to receive a second fuel gas stream including the fuel gas, and to consume the second fuel gas stream to generate a second high-voltage electrical output associated with the first voltage.

The electrical power generation system may also include a parallel panel in electrical communication with the first power generation module and the second power generation module. The parallel panel may be adapted to receive the first and second high-voltage electrical outputs; and combine and/or synchronize the first and second high-voltage electrical outputs into a combined high-voltage electrical output.

The electrical power generation system may also include an electrical transformation module in electrical communication with the parallel panel. The electrical transformation module may be adapted to receive the combined high-voltage electrical output; and transform the combined high-voltage electrical output into a low-voltage electrical output associated with a second voltage that is lower than the first voltage.

The flare mitigation system may further include a distributed computing system powered by the electrical power generation system. The distributed computing system may include a communications system having one or more data satellite antennas in order to provide a network. Moreover, the distributed computing system may include a first mobile data center having an enclosure defining an interior space; a plurality of distributed computing units located within the interior space of the enclosure, each of the plurality of distributed computing units in communication with the network; and a power system located at least partially within the interior space of the enclosure, the power system in electrical communication with the electrical transformation module and the plurality of distributed computing units such that the power system receives the low-voltage electrical output and powers each of the plurality of distributed computing units.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

System Overview

Figure 1:
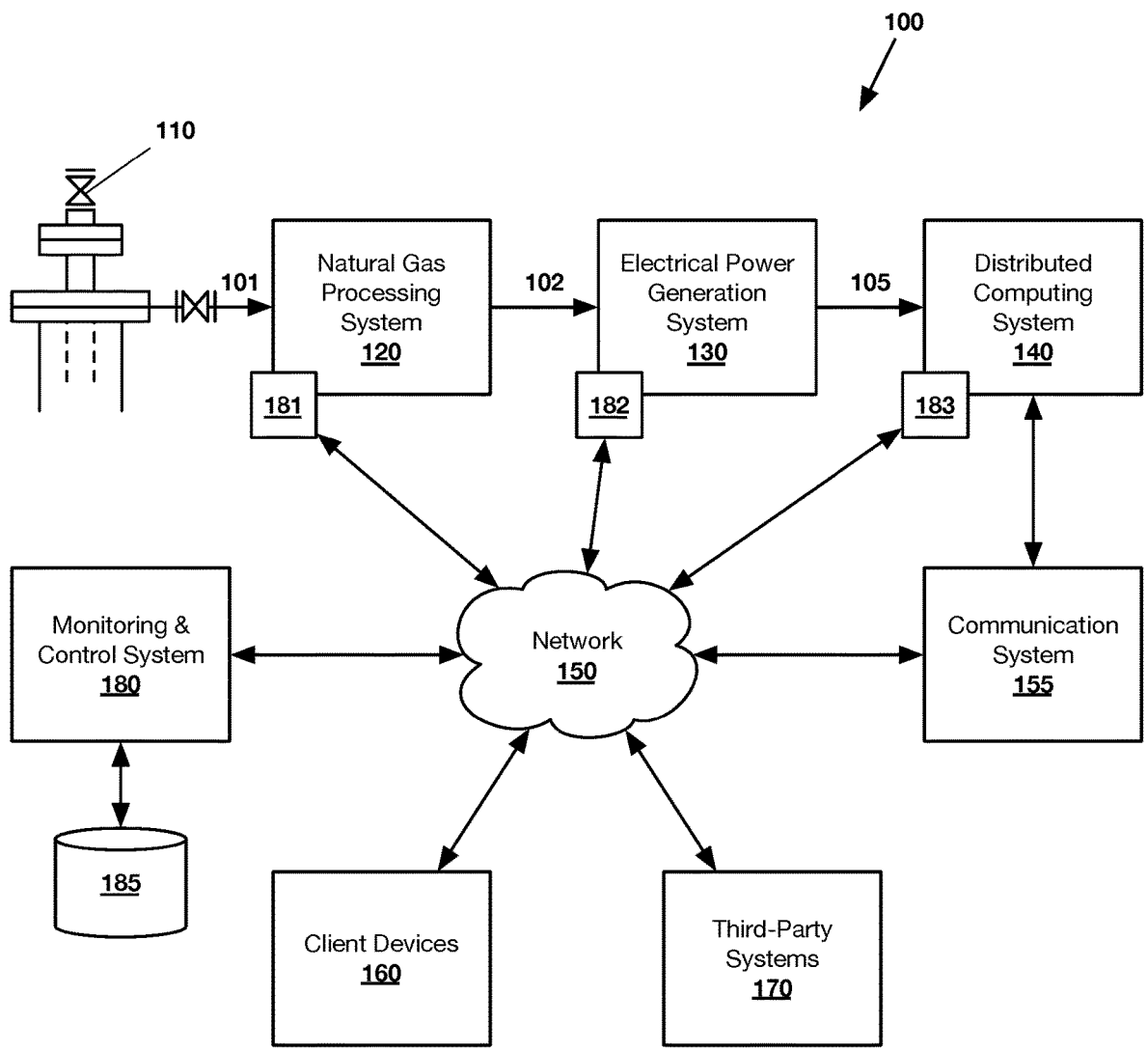
FIG. 1 shows an exemplary flare mitigation system 100 according to an embodiment.

Referring to FIG. 1, an exemplary flare mitigation system 100 according to an embodiment is illustrated. As shown, the system 100 may comprise a natural gas processing system 120, an electrical power generation system 130, a distributed computing system 140, a communication system 155 and a monitoring and control system 180.

In one embodiment, the flare mitigation system 100 may comprise a natural gas processing system 120 adapted to receive a raw natural gas stream 101 from one or more wellheads 110 in an oil and/or gas reservoir. The natural gas processing system 120 is generally adapted to convert the received raw natural gas 101 into a fuel gas stream 102 that may be introduced to an electrical power generation system 130. As discussed in detail below with respect to FIG. 2, the natural gas processing system 120 may employ a separator module and, optionally, any number of additional modules (e.g., a compressor module, a carbon dioxide removal module, a desulfurization module and/or a refrigeration module) to produce a fuel gas stream 102 meeting the specific requirements of the electrical power generation system 130 and any number of secondary streams.

The electrical power generation system 130 generally comprises any number of power generation modules adapted to consume the fuel gas 102 and convert the same into electrical power. As discussed in detail below with respect to FIGS. 3-4, each power generation module may be in electrical communication with an electrical transformation module adapted to receive the electrical output of the power generation module(s) and convert the same into an electrical flow 105 that may be employed to power the electrical components of a distributed computing system 140.

In one embodiment, the distributed computing system 140 may comprise any number distributed computing units ("DCUs") in electrical communication with the electrical power generation system 130, such that the DCUs are powered via the electrical flow 105 output by the system. The DCUs may comprise a modular computing installation, for example, a data center, cryptocurrency mine or graphics computing cell. And the DCUs are generally adapted to conduct any number of processing-intensive tasks. For example, the DCUs may be employed to execute graphics-intensive distributed computing processes, artificial intelligence ("AI") research, machine learning model training, data analysis, server functions, storage, virtual reality and/or augmented reality applications, tasks relating to the Golem Project, non-currency blockchain applications and/or cryptocurrency mining operations.

In certain embodiments, the DCUs may be employed to execute mathematical operations in relation to the mining of cryptocurrencies including computing the following hashing algorithms: SHA-256, ETHash, scrypt, CryptoNight, RIP-EMD160, BLAKE256, X11, Dagger-Hashimoto, Equihash, LBRY, X13, NXT, Lyra2RE, Qubit, Skein, Groestl, BOINC, X11gost, Scrypt-jane, Quark, Keccak, Scrypt-OG, X14, Axiom, Momentum, SHA-512, Yescrypt, Scrypt-N, Cunningham, NIST5, Fresh, AES, 2Skein, Equilhash, KSHAKE320, Sidechain, Lyra2RE, HybridScryptHash256, Momentum, HEFTY1, Skein-SHA2, Qubit, SpreadX11, Pluck, and/or Fugue256. Additionally or alternatively, the DCUs may be adapted to execute mathematical operations in relation to training computationally intensive machine learning, artificial intelligence, statistical or deep learning models, such as neural networks, recurrent neural networks, convolutional neural networks, generative adversarial networks, gradient boosting machines, random forests, classification and regression trees, linear, polynomial, exponential and generalized linear regressions, logistic regression, reinforcement learning, deep reinforcement learning, hyperparameter optimization, cross validation, support vector machines, principal component analysis, singular value decomposition, convex optimization, and/or independent component analysis.

As discussed in detail below with respect to FIG. 5, the distributed computing system 140 may comprise one or more mobile data centers, wherein each mobile data center houses a plurality of DCUs therein. In addition to the DCUs, each mobile data center may further house an electrical power system, one or more backup power systems, an environment control system, and/or various monitoring and control equipment 183.

In certain embodiments, the mobile data center (and any electronic components contained therein) may be in communication with a communication system 155. For example, the mobile data center may be in direct communication with the communication system 155 via a wired connection. As another example, the DCUs may be in indirect communication with the communication system 155 via a network 150.

In one embodiment, the communication system 155 may comprise one or more data satellite antennas in communication with one or more high-orbit and/or low-orbit satellites. The antennas may be roof-mounted to one or more mobile data centers and/or may be pole-mounted into the ground nearby such mobile data centers. A typical configuration is for two antennas to serve a single mobile data center in order to provide reliability and redundancy; however, a single antenna may be sufficient depending on bandwidth requirements and total DCU count. Alternatively, many (e.g., three or more) antennas may be mounted to a roof of a single mobile data center, and communications cables may extend from the mobile data center to other nearby mobile data centers to provide a centralized communications solution.

The one or more data satellite antennas of the communication system 155 may be specified for continuous outdoor use, and may be installed using robust mounting hardware to ensure alignment even during heavy wind or other storms common in the oilfield. Antenna modems may be housed inside a mobile data center for warmth, security and weatherproofing, and such modems may be connected to the power system of the mobile data center.

In one embodiment, the communication system 155 may provide an internal network that includes automatic load-balancing functionality such that bandwidth is allocated proportionately among all active antennas. In such embodiment, if a single antenna fails, the lost bandwidth is automatically redistributed among all functioning antennas. This is an important reliability feature for oilfield operations, where equipment failures due to storms are possible.

In another embodiment, the antennas and satellite internet systems of the communication system 155 may be specified based on the needs of the distributed computing system 140, with specific attention paid to bandwidth and latency requirements. For lower bandwidth applications such as certain blockchain processing, cryptocurrency mining and/or long-term bulk data processing jobs, high-orbit satellite connectivity ranging from 10 MB/s to 100 MB/s may be specified. For higher bandwidth or low latency requirements such as artificial intelligence model training, iterative dataset download and boundary spamming projects, visual processing such as images or videos, natural language processing, iterative protein folding simulation jobs, videogaming, or any other high capacity data streaming or rapid communication jobs, low-orbit satellites may be specified to provide significantly increased speeds and reduced latency.

In any event, the communication system 155 may provide a network 150 to which various components of the flare mitigation system 100 may be connected. The network 150 may include wide area networks ("WAN"), local area networks ("LAN"), intranets, the Internet, wireless access networks, wired networks, mobile networks, telephone networks, optical networks, or combinations thereof. The network 150 may be packet switched, circuit switched, of any topology, and may use any communication protocol. Communication links within the network 150 may involve various digital or an analog communication media such as fiber optic cables, free-space optics, waveguides, electrical conductors, wireless links, antennas, radio-frequency communications, and so forth.

As shown, the flare mitigation system further 100 comprises a MC system 180, which is generally adapted to maintain processing conditions within acceptable operational constraints throughout the system. Such constraints may be determined by economic, practical, and/or safety requirements. The MC system 180 may handle high-level operational control goals, low-level PID loops, communication with both local and remote operators, and communication with both local and remote systems. The MC system 180 may also be in communication with ancillary systems, such as storage systems, backup systems and/or power generation systems.

In one embodiment, the MC system 180 may be in communication with various monitoring and control equipment (181-183), such as sensors and/or controllers, via the network 150. Such monitoring and control equipment (181-183) may be in further communication with various components of the natural gas processing system 120, the electrical power generation system 130 and/or the distributed computing system 140, such that the MC system 180 may remotely monitor and control operating parameters throughout the flare mitigation system 100. Exemplary operating parameters may include, but are not limited to, profile of the raw natural gas supply, gas flow rate at various locations, gas pressure at various locations, temperature at various locations, electrical output at one or more locations, electrical load at one or more locations, and/or others.

As an example, the MC system 180 may determine a change in the profile, flow rate and/or pressure of the raw natural gas 101 and then automatically modulate electrical load of a mobile data center accordingly. And as another example, the MC system 180 may automatically reduce a processing rate of one or more DCUs in response to receiving an indication that supply gas pressure has decreased.

In one embodiment, any number of users may access the MC system 180 and/or the distributed computing system 140 via a client device 160 in communication with the network 150. Generally, a client device 160 may be any device capable of accessing such systems (e.g., via a native application or via a web browser). Exemplary client devices 160 may include general purpose desktop computers, laptop computers, smartphones, and/or tablets. In other embodiments, client devices 160 may comprise virtual reality ("VR") and/or augmented reality ("AR") hardware and software, which allow users to provide input via physical gestures.

The relationship of the client device 160 to such systems arises by virtue of computer programs running on the respective computers and having a client-server relationship to each other. Accordingly, each of the client devices 160 may have a client application running thereon, where the client application may be adapted to communicate with a MC application running on a MC system 180 and/or a distributed computing application running on a distributed computing system 140, for example, over a network 150. Thus, the client application may be remote from the MC system 180 and/or the distributed computing system 140. Such a configuration may allow users of client applications to interact with one or both of such systems from any location. Moreover, because the MC system 180 is capable of transceiving information to/from the various other systems (e.g., natural gas processing system 120, electrical power generation system 130, distributed computing system 140, and communication system 155), a user may interact with such systems via the MC system.

As discussed in detail below, one or more MC system applications and/or distributed computing system applications may be adapted to present various user interfaces to users. Such user interfaces may be based on information stored on the client device 160 and/or received from the respective systems. Accordingly, the application(s) may be written in any form of programming language, including compiled or interpreted languages, or declarative or procedural languages, and it can be deployed in any form, including as a standalone program or as a module, component, subroutine, or other unit suitable for use in a computing environment. Such software may correspond to a file in a file system. A program can be stored in a portion of a file that holds other programs or data. For example, a program may include one or more scripts stored in a markup language document; in a single file dedicated to the program in question; or in multiple coordinated files (e.g., files that store one or more modules, sub programs, or portions of code).

Each of the MC system application(s) and/or distributed computing system application(s) can be deployed and/or executed on one or more computing machines that are located at one site or distributed across multiple sites and interconnected by a communication network. In one embodiment, an application may be installed on (or accessed by) one or more client devices 160.

In certain embodiments, the MC system 180 and/or the client device 160 may be adapted to receive, determine, record and/or transmit application information relating to one or more components of the flare mitigation system 100. The application information may be received from and/or transmitted to the natural gas processing system 120, the electrical power generation system 130 and/or the distributed computing system 140 via, for example, monitoring and/or control equipment (181, 182, 183, respectively) in communication with one or more components of such systems and in further communication with the network 150. Moreover, any of such application information may be stored in and/or retrieved from one or more local or remote databases (e.g., database 185).

In one embodiment, the MC system 180 may be connected to one or more third-party systems 170 via the network 150. Third-party systems 170 may store information in one or more databases that may be accessed by the MC system 180. The MC system 180 may be capable of retrieving and/or storing information from third-party systems 170, with or without user interaction. Moreover, the MC system may be capable of transmitting stored/received information to such third-party systems.

It will be appreciated that various components of the flare mitigation system 100 may be modular such that they may be combined to form a modular system. For example, the modular components that make up the natural gas processing system 120, the electrical power generation system 130, the distributed computing system, and/or the communication system 155 may be transported to an oil filed and assembled into the respective subsystems of the flare mitigation system 100.

In one embodiment, the natural gas processing system 120, electrical power generation system 130, distributed computing system 140 and the communication system 155 may be designed to allow all components of such systems to fit inside the height and width of a portable container, such as a shipping container or similar prefabricated enclosure that is transportable using a standard drop-deck semi-trailer.

It will be appreciated that such configuration allows for enhanced mobility of the flare mitigation system 100 to various field sites.

Moreover, some or all of the aforementioned systems/components may be pre-mounted to a fixed skid, wheeled trailer or other form of mounting brackets in order to simplify and expedite transportation. Key benefits of this approach include reduced assembly time and expense in the field, where oilfield contract labor is often more expensive than shop labor, and where contractor availability (such as electricians) may be constrained. Wheel-mounted solutions may also qualify for special treatment as "temporary equipment," facilitating expedited or reduced regulatory processing in the oilfield environment. Pre-mounting equipment also allows for an operator to quickly re-mobilize the system 100 to a new site if the original gas flow associated with the original well declines or a new area experiences a greatly increased demand for flare mitigation.

It will be further appreciated that, the natural gas processing system 120, electrical power generation system 130, distributed computing system 140 and/or the communication system 155 may be designed to allow for individual components of such subsystems to be added or removed, as necessary, to provide a flare mitigation system 100 that aims to consume substantially all raw natural gas 101 produced at the wellhead 110. This configuration is important, as each well's gas flow rate, pressure and composition will be unique and may change over time.

For example, the electrical power generation system 130 may be modified to include additional power generation modules and/or electrical transformation modules and the distributed computing system 140 may be modified to include additional mobile data centers to mitigate increasingly larger volumes of gas during initial flow back and peak production phases of a well's life. Conversely, modules may be removed to accommodate declining flow rates. As another example, individual DCUs within a mobile data center of the distributed computing system 140 can also be remotely "turned down" or turned off to fit gas demand with gas production at each individual wellhead 110.

Using the above-described system 100, inexpensive and abundant stranded gas 101 can be used to power multi-megawatt-scale power generation equipment to produce power 105 for on-site or adjacent cryptocurrency mining operations. For example, the system may consume raw natural gas having a heat value of at least 1,000 Btu/scf at a rate of 1.3 MMscfd to power approximately 3,300 DCUs having a 14 TH/s mining hash rate (e.g., ANTMINER S9 mining rigs), which is equivalent to a moderate scale commercial mining operation. The cost to power this same mining operation would be about $2.6 million annually under a commercial power purchase agreement ($0.06/kwh).

Natural Gas Processing System

Figure 2:
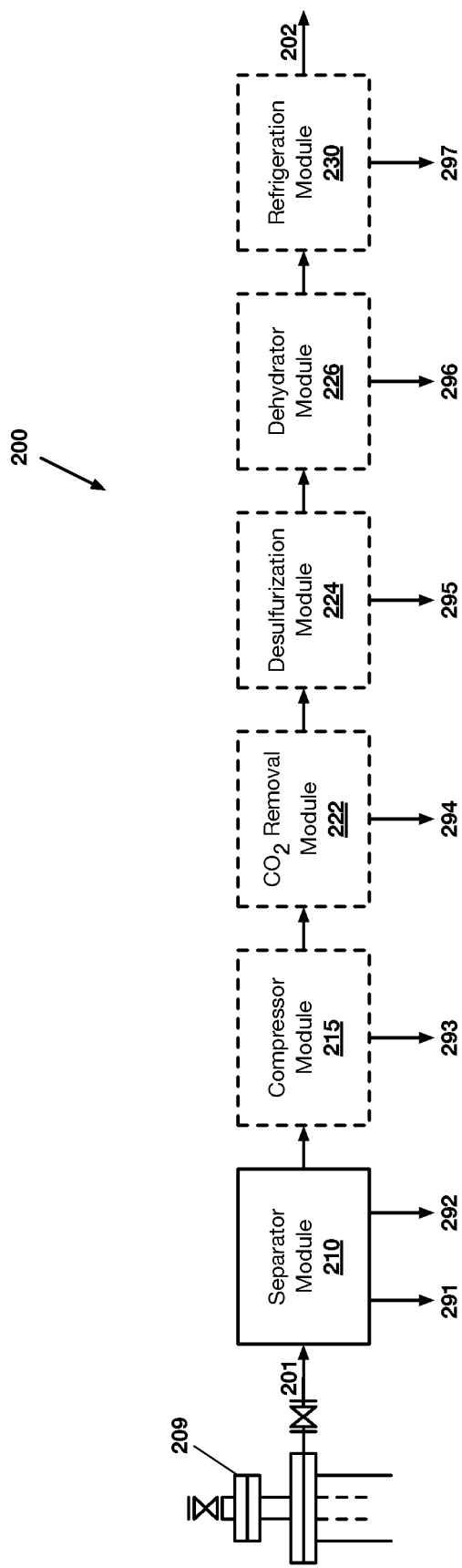
FIG. 2 shows an exemplary natural gas processing system 200 according to an embodiment.

Referring to FIG. 2, an exemplary natural gas processing system 200 according to an embodiment is illustrated. As shown, the system 200 may comprise a separator module 210 and various optional components, such as a compressor module 215, a $CO_2$ removal module 222, a desulfurization module 224, a dehydrator module 226 and/or a refrigerator module 230.

Generally, the natural gas processing system 200 is adapted to convert a raw natural gas stream 201 received from one or more oil and/or gas wellheads 209 into a fuel gas stream 202 and, optionally, various secondary streams. As used herein, the term "raw natural gas" or "raw gas" means unprocessed natural gas released during oil and/or gas production. Raw natural gas 201 may also be referred to as "associated gas," "flare gas," "produced gas," and/or "stranded gas."

Raw natural gas 201 at a wellhead 209 is commonly a mixture of hydrocarbons, including methane ($CH_4$), ethane ($C_2H_6$), propane ($C_3H_6$), butane ($C_4H_{10}$), pentane ($C_5H_{12}$), hexane ($C_6H_{14}$) and higher hydrocarbons. The raw natural gas 201 also contains other compounds such as water vapor ($H_2O$), hydrogen sulfide ($H_2S$), carbon dioxide ($CO_2$), oxygen ($O_2$), and nitrogen ($N_2$). Table 1, below, shows properties of exemplary raw gas from wellheads in the Bakken Formation.

TABLE 1

Exemplary Raw Natural Gas Properties

| Component | Value |
|---|---|
| Methane | 48-85 mol % |
| Ethane | 12-20 mol % |
| Propane | 5-15 mol % |
| Butane+ (C4+) | 4-17 mol % |
| $CO_2 + N_2$ | 1.5-3.5 mol % |
| $H_2S$ | 0-2.0 mol % |
| Heat Value | 1,200-1,715 Btu/scf |
| Wobbe Index | 43-57 |
| $H_2O$ | 10-50 lbs/MMscf |

As used herein, the term "fuel gas" 202 refers to a natural gas stream that has been processed by a natural gas processing system 200 such that it may be used by an electrical power generation system (e.g., FIG. 1 at 130) to generate electrical power for a distributed computing system (FIG. 1 at 140). It will be appreciated that the properties of the fuel gas 202 produced by the natural gas processing system 200 may vary depending on the raw natural gas and requirements of the employed electrical power generation system.

Nevertheless, the fuel gas 202 will typically comprise a heat value of at least about 1,000 Btu/scf and a methane content of at least about 80%. In some embodiments, the fuel gas 202 may be processed to contain less than about 1% pentane and higher hydrocarbons (C5+) components. Moreover, such fuel gas 202 may be optionally be processed to contain less than about 5% propane and higher hydrocarbons (C3+) components.

In some embodiments, the produced fuel gas 202 may be substantially free of particulate solids and liquid water to prevent erosion, corrosion or other damage to equipment. Moreover, the fuel gas may be dehydrated of water vapor sufficiently to prevent the formation of hydrates during downstream processing. And, in certain embodiments, the produced fuel gas 202 may contain no more than trace amounts of components such as $H_2S$, $CO_2$, and $N_2$.

As shown, the raw natural gas 201 received from the wellhead 209 may first be introduced to a separator module 210 such that liquids (e.g., oil 291 and/or water 292) may be separated and removed therefrom. Generally, the separator module 210 may comprise at least one multi-phase separator, such as a 2-phase separator (separating liquids and gas), or a 3-phase separator (separating oil, water, and gas), In one particular embodiment, the separator module 210 comprises a 3-phase separator. An exemplary 3-phase separator may comprise a vessel having an inlet to receive the raw natural gas 201, an outlet through which free gas exits the vessel, an outlet through which water exits the vessel, and an outlet through which oil exits the vessel. Upon entering the vessel, the raw gas 201 may encounter an inlet deflector, which causes initial separation of gas from a liquid mixture of oil and water. The free gas may then rise within the vessel, while the heavier liquid mixture descends therewithin. And, optionally, a divertor may be employed within the vessel to redirect flow of the liquid mixture and to allow it to settle more readily within the vessel.

Once separated from the liquid, the free gas may flow through a mist extractor that removes any entrained liquids remaining in the gas. The resulting gas stream then flows out of the top of the separator vessel, through the gas outlet.

As the liquid mixture settles within the separator vessel, the oil separates from the water and rises out of solution. In one embodiment, a weir plate may be employed to allow the oil to pour into an oil chamber or bucket, while preventing the water from entering the chamber. Additionally, the separator may include a metal protector plate to block any splashing liquid from entering the gas outlet.

Generally, the recovered oil 291 can be directed to an oil storage tank or may be transported for sale via truck, rail or pipe. And the water 292 may be sent to a water storage tank, treated on-site, disposed of, and/or transported to a wastewater treatment facility or other reclamation zone.

In one embodiment, the separator module 210 may comprise, or otherwise be placed in communication with, various monitoring and/or control equipment. Such equipment may be adapted to measure, determine and/or control various operating parameters at any number of locations throughout the separator module 210. As discussed above, such equipment may be in communication with a remote MC system (e.g., via a network) to allow for both (1) remote monitoring and control of the separator module 210 by any number of operators and (2) automatic control thereof.

As an example, the separator module 210 may comprise any number of pressure monitors, flow meters, regulators and/or control valves to monitor/control gas and/or liquid processing parameters (e.g., inlet/outlet pressure, inlet/outlet flow, level, etc.). Such equipment may be located within one or more vessels, on one or more inlets and/or on one or more outlets of the separator module 210.

It will be appreciated that the separator module 210 may further comprise any number of safety valves adapted to direct flow to a safe and contained area upon overpressurization of the vessel. In one embodiment, the separator module may comply with ASME VIII, Division 1 and NACE MR-0175 for H2S environments. Additionally or alternatively, the separator module may comprise a skid designed to SEPCO OPS055 and/or API RP2A standards.

In certain embodiments, the separator module 210 may further comprise a heater-treater component located upstream of the multi-phase separator or integral therewith. Generally, the heater-treater may comprises a pressurized vessel, or a series of pressurized vessels, in which a bottom-mounted, heat source is operated. During operation, the heater-treater heats the raw natural gas 201 received from the wellhead 209 by means of direct contact with the heat source and the ensuing temperature increase reduces molecular attraction between oil and water molecules contained therein. Accordingly, when the heated raw natural gas is passed to the multi-phase separator, water droplets may settle out of the liquid more rapidly.

In one embodiment, the gas stream produced by the separator module 210 may be of a sufficient quality to be directly utilized as fuel gas 202 for a power generation module of the electrical power generation system. In such cases, the resulting gas stream 202 may not be introduced to any of the optional processing modules shown in FIG. 2; rather, it may be transferred directly to an electrical power generation module. It will be appreciated that, although the illustrated optional processing modules are not employed in this embodiment, the fuel gas 202 may be aggregated (e.g., in a field gathering pipeline) before being introduced to the electrical power generation module. Additionally or alternatively, conventional valves and/or compressors may be employed upstream of the electrical power generation module to regulate the pressure of the fuel gas 202.

In other embodiments, the gas stream produced by the separator module 210 may require additional processing upstream of the power generation module. In such cases, the natural gas processing system 200 may comprise one or more of: a compressor module 215, a $CO_2$ removal module 222, a desulfurization module 224, a dehydrator module 226 and/or a refrigeration module 230.

Generally, a compressor module 215 may be employed to increase the pressure of the gas stream from an initial pressure of from about 15 psi to about 50 psi, to a final pressure of from about 150 psi to about 350 psi. Such pressure increase may be desired or required when a refrigeration module 230 is employed (discussed below) and/or in cases where the fuel gas 202 is to be introduced to a power generation module comprising a turbine.

As a result of the pressure increase, the compressor module 215 may also remove heavy natural gas liquids ("NGLs") stream 293 comprising pentane and higher hydrocarbons (C5+) from the natural gas. To that end, the compressor module 215 may comprise any number of individual compressor units operating to raise and lower the pressure of the received gas stream, during any number of compression stages, such that the NGLs 293 contained therein may be liquified and removed. The resulting NGLs stream 293 may exit the compressor module 215 and may be stored in a storage tank and/or transported for sale via truck, rail or pipe.

Accordingly, the compressor module 215 may produce a resulting gas stream comprising methane, ethane, propane, and butane, wherein the gas stream is substantially free of pentane and higher hydrocarbons (C5+). That is, the resulting compressed gas stream will typically comprise less than about 1% C5+ hydrocarbons, such that the stream comprises a heat content of from about 1,200 Btu/scf to about 1,500 Btu/scf.

In one embodiment, the compressor module 215 may comprise any number of individual compressor units. The compressor units may be driven by either conventional piston engines or natural gas turbines, and such units are typically fueled by a portion of the natural gas (although some or all of the units may be electrically powered if required). The compressor units typically operate in parallel, although some or all of the compressor units may be operated in stages (serially) as desired or required.

As the gas is compressed, heat is generated and must be dissipated to cool the gas stream before leaving the compressor module. Accordingly, the compressor module 215 may comprise an aerial cooler system to dissipate excess heat (e.g., an "after cooler"). Additionally, the heat generated by operation of the individual compressor units may be dissipated via a sealed coolant system.

The compressor module 215 may comprise, or otherwise be placed in communication with, various monitoring and/or control equipment adapted to monitor and/or control operating parameters (e.g., gas flow and/or pressure) across all compressor units. Such equipment may be in communication with the remote MC system (e.g., via a network) to allow for remote monitoring and control of the compressor module 215 by any number of operators and/or for automatic control thereof.

In certain embodiments, the natural gas processing system 200 may include a $CO_2$ removal module 222 to remove $CO_2$ 294 from the gas stream. Generally, the $CO_2$ removal module 222 will be employed, as required, to meet pipeline specifications. For example, the $CO_2$ removal module 222 may be employed to reduce $CO_2$ content in the gas stream to less than about 1% $CO_2$.

In one embodiment, the $CO_2$ removal module 222 may comprise one or more membranes, such as a spiral-wound cellulose acetate membrane. Generally, the membrane operates on the principle of selective permeation, where components with higher permeation rates (e.g., $CO_2$) permeate through a membrane faster than those with lower permeation rates (e.g., methane, ethane and heavier hydrocarbons). Accordingly, the gas feed stream may be separated into a hydrocarbon-rich (residual) stream on the exterior of the membrane fiber and a $CO_2$-rich (permeate) stream on the interior of the membrane fiber.

It will be appreciated that the $CO_2$ removal module 222 may be adaptable to various gas volumes, $CO_2$ concentrations, and/or fuel gas specifications. Moreover, operational parameters of the $CO_2$ removal module, such as pressure difference between the feed gas and permeate gas and/or concentration of the permeating component, may be monitored and/or controlled via various equipment in communication with the remote MC system.

In another embodiment, the $CO_2$ removal module 222 may comprise an amine sorbent system. As known in the art, such systems are adapted to absorb $CO_2$ and then desorb the $CO_2$ to atmosphere.

In one embodiment, the natural gas processing system 200 may include a desulfurization module 224 adapted to remove sulfur 295 from the gas stream. Generally, sulfur exists in natural gas as hydrogen sulfide ($H_2S$), and the natural gas will typically require desulfurization when its $H_2S$ content exceeds about 0.01 lbs/Mscf. It will be appreciated that gas containing high levels of $H_2S$ (i.e., "sour gas") is undesirable because it is both corrosive to equipment and dangerous to breathe.

The desulfurization module 224 may employ various technologies to "sweeten," or remove sulfur from, sour gas. In one embodiment, the desulfurization module 224 may employ dry sorbents to capture sulfur gases in solid form (e.g., as sulfates or sulfites). In one such embodiment, a fine sorbent may be injected into the feed gas and the resulting sulfur-containing solids 295 may be collected. Exemplary dry sorbents that may be employed include, but are not limited to, calcium oxide, magnesium oxide, and sodium carbonate.

In an alternative embodiment, the desulfurization module 224 may comprise a wet scrubber subsystem, such as venturi, packed-column, or tray-type systems. In this embodiment, the feed gas may be contacted with a scrubbing solution or slurry to absorb the $H_2S$ and convert it to mercaptans, which are then drained from the spent bed in liquid form.

In yet another embodiment, the desulfurization module 224 may employ amine solutions to remove $H_2S$. During this process, the feed gas is run through a tower containing an amine solution that absorbs sulfur. Exemplary amine solutions may include, but are not limited to, monoethanolamine ("MEA") and diethanolamine ("DEA"). In one such embodiment, the amine solution may be regenerated (i.e., the absorbed sulfur may be removed) and reused.

In certain embodiments, the sulfur-containing discharge 295 may be discarded. However, in other embodiments, the sulfur may be reduced to its elemental form via further processing and then sold. One exemplary process employed to recover sulfur is known as the "Claus process" and involves using thermal and catalytic reactions to extract the elemental sulfur from the hydrogen sulfide solution.

It will be appreciated that, no matter which of the above technologies is employed by the desulfurization module 224, a resulting gas stream may be produced that is virtually free of sulfur compounds. That is, the resulting gas stream may comprise a sulfur content of less than about 0.01 lbs/Mscf.

The natural gas processing system 200 may additionally or alternatively comprise a dehydrator module 226 adapted to remove water 296 from the gas stream. Generally, the dehydrator module 226 may be employed to reduce the moisture content of the gas stream to about 7 lbs/Mscf or less. This mitigates the risk of damage to pipes and process equipment from blocked flow and corrosion.

In one embodiment, the dehydrator module 226 may comprise any number of dryer beds including one or more desiccants. Exemplary desiccants include, but are not limited to: activated charcoal/carbon, alumina, calcium oxide, calcium chloride, calcium sulfate, silica, silica alumina, molecular sieves (e.g., zeolites), and/or montmorillonite clay. In one particular embodiment, desiccant materials may be present in a packed-bed configuration.

It will be appreciated that most desiccants have a limited adsorption capacity and must be replaced or regenerated at given service intervals. Accordingly, for continuous dehydration service, a multi-bed system may be employed where one or more beds are utilized while the others are being replaced/regenerated. The active bed(s) can then be switched in and out of service as required or desired.

In another embodiment, the dehydrator module 226 may comprise a Triethylene Glycol ("TEG") system. This system contacts the wet gas with TEG, which absorbs the water from the wet gas stream to produce a rich TEG stream. The rich TEG stream is heated with a gas-fired heater and the water is driven off in the form of water vapor to atmosphere. The lean TEG stream may then be cooled and pumped back to contact the gas stream.

In other embodiments, the dehydrator module 226 may remove water through the use of additives, such as methanol or ethylene glycol, which may be sprayed into the natural gas stream to suppress the freezing point of liquid water. In yet other embodiments, dehydration may comprise a number of steps, including active dehydration, depressurization, regeneration, and repressurization.

In certain embodiments, the natural gas processing system 200 may include a refrigeration module 230 comprising one or more mechanical refrigeration units ("MRU"). Generally, the refrigeration module may be employed to cool natural gas in an effort to reduce the hydrocarbon dew point of the gas (e.g., to meet pipeline quality specifications) and/or to maximize NGLs recovery (e.g., to improve the overall monetary return of a natural gas stream).

In one embodiment, the refrigeration module 230 may be adapted to lower the temperature of the received gas stream to a target temperature, such that NGLs comprising propane and higher hydrocarbons (C3+) 297 may be separated therefrom. The target temperature may be selected to allow the NGLs stream 297 to be condensed (e.g., in a single column), without condensing substantial amounts of methane or ethane. Accordingly, the condensed NGLs stream 297 may be separated and transported for sale via truck, rail or pipe; and the resulting fuel gas stream 202, which comprises mostly methane and ethane, may be transferred to the electrical power generation module.

In certain embodiments, the refrigeration module 230 may lower the temperature of the received gas stream via heat exchange with a low temperature fluid (i.e., a refrigerant). Exemplary refrigerants include, but are not limited to, propane, propylene ($C_3H_6$), n-butane, and/or ethylene ($C_2H_4$). It will be appreciated that other hydrocarbon and non-hydrocarbon refrigerants may additionally or alternatively be employed.

Generally, the refrigeration module 230 may cool the received gas stream to a target temperature of from about −10° F. to about −32° F., depending on the composition of the received gas stream. During cooling, the pressure may be adjusted to, or maintained at, from about 70 psi to about 510 psi.

In one particular embodiment, the refrigeration module 230 may comprise a cascade refrigerator that employs two or more refrigeration stages in series to achieve a lower temperature than is otherwise achievable in a single stage. For example, the refrigerator may cool the gas to a first temperature during a first stage (i.e., a "high stage"), and then cool the gas to a second temperature that is lower than the first temperature during a second stage (i.e., a "low stage").

It will be appreciated that operational parameters of the refrigeration module 230 may be monitored and/or controlled across any number of refrigeration units via various equipment in communication with the remote MC system. Such operational parameters may include, but are not limited to, temperature and/or coolant recirculation rate.

It will be appreciated that many aspects of the system 200 depicted in FIG. 2 may be modified or altered to produce fuel gas 202 from raw natural gas 201 received from one or more wellheads 209 in an oil and gas reservoir. The illustrated system 200 is exemplary, and is intended to show broadly the relationship between the various aspects of the system.

Electrical Power Generation System

Figure 3:
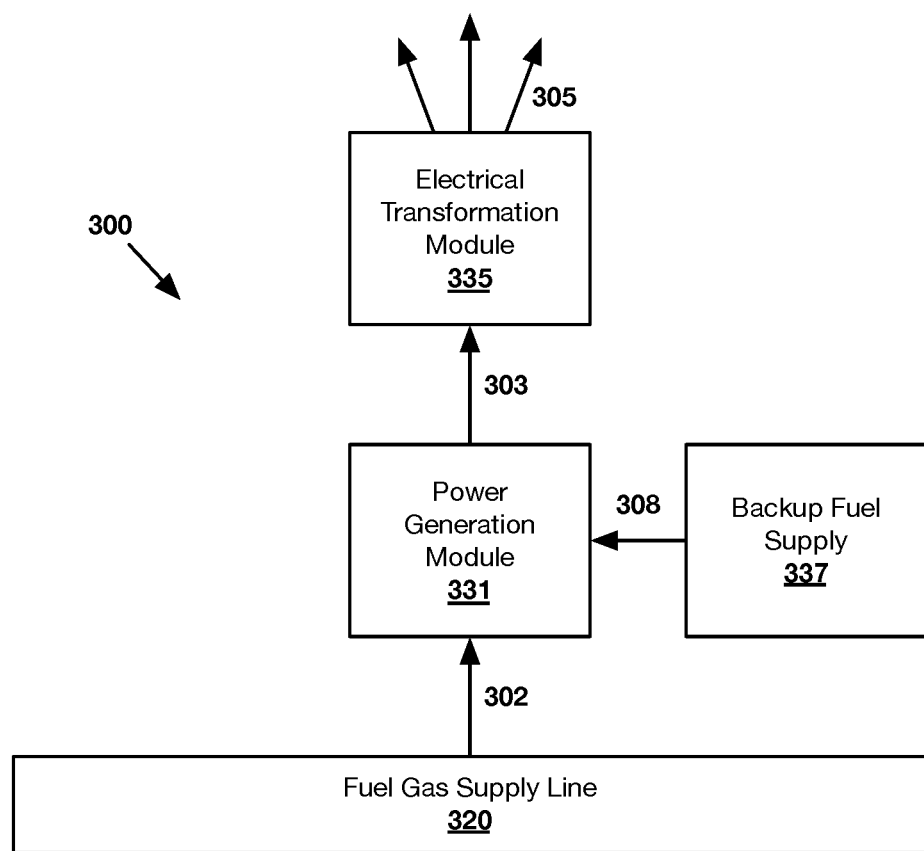
FIG. 3 shows an exemplary electrical power generation system 300 comprising a power generation module 331 in electrical communication with an electrical transformation module 335.
Figure 4:
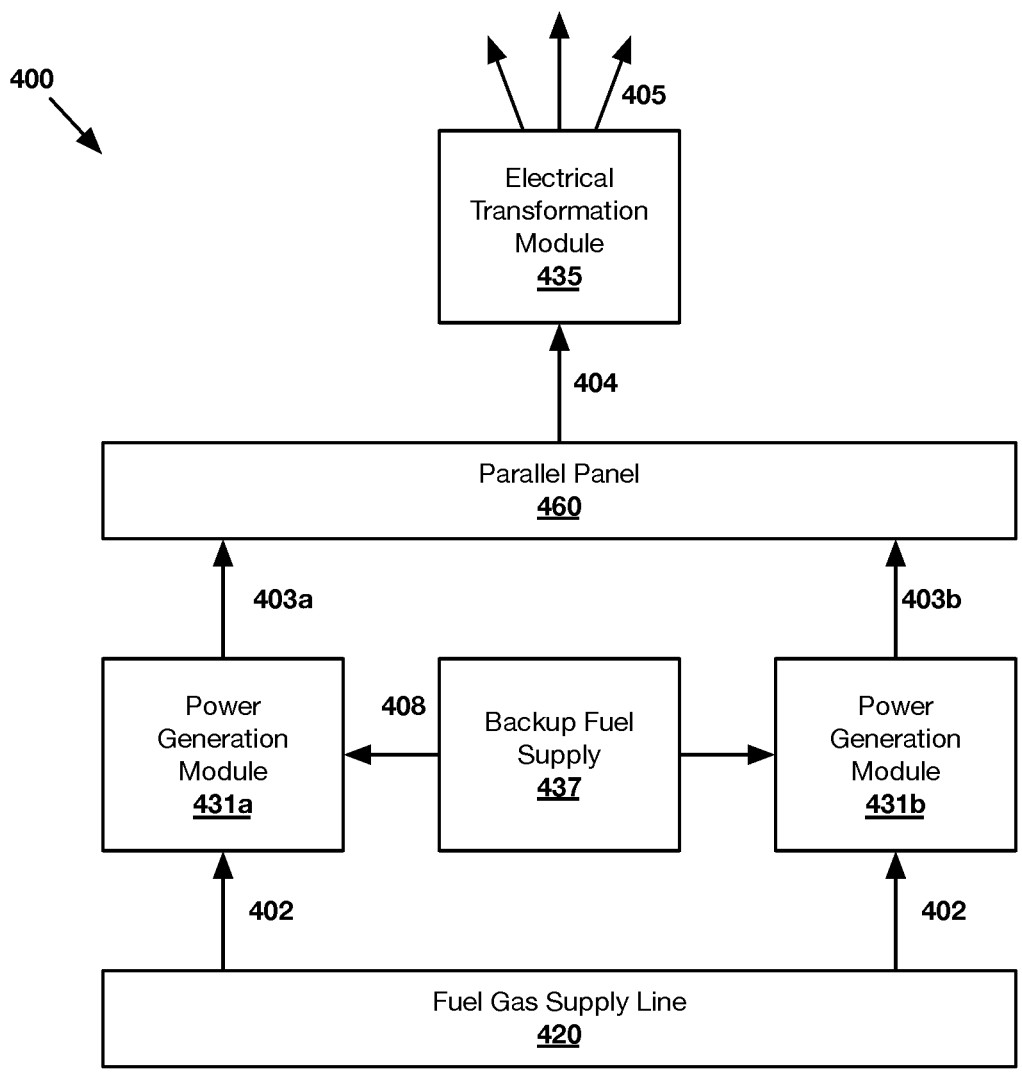
FIG. 4 shows another exemplary electrical power generation system 400 comprising a plurality of power generation modules (431a, 431b) in electrical communication with an electrical transformation module 435 via a parallel panel 460.

FIGS. 3-4 show exemplary electrical power generation systems (300, 400) according to various embodiments. FIG. 3 shows an exemplary electrical power generation system 300 comprising a power generation module 331 in electrical communication with an electrical transformation module 335. And FIG. 4 shows an exemplary electrical power generation system 500 comprising a plurality of power generation modules (431a, 431b) in a parallel configuration, wherein such modules are in electrical communication with a single electrical transformation module 435.

Referring to FIG. 3, an exemplary electrical power generation system 300 is illustrated. As shown, the system 300 comprises a power generation module 331 in communication with a gas supply line 320 such that it may receive fuel gas 302 therefrom. The power generation module 331 is further shown to be in electrical communication with an electrical transformation module 335 such that an electrical output 303 may be transmitted from the power generation module to the electrical transformation module.

Generally, the power generation modules 331 may comprise a generator component adapted to convert fuel gas 302 into electrical energy 303, various equipment for monitoring and controlling the generator component, and ancillary equipment to support the generator component. As discussed below, each of these components may be contained within a protective housing such that the entire power generation module 331 is transportable.

In one embodiment, the power generation module 331 may comprise a generator component adapted to generate an electrical output 303 via combustion of the fuel gas 302. Generally, the generator component may employ either a fuel-gas-driven reciprocating engine or a fuel-gas-driven rotating turbine to combust the fuel gas 302 and drive an electrical generator.

The generator component may be associated with various properties, such as various input fuel requirements, a fuel gas consumption rate and an electrical output. The input fuel requirements of a given generator component specify the required properties of fuel received by the generator. As discussed above, the employed power generation modules 331 may be specified to operate with fuel gas 302 having a wide variety of properties. For example, certain modules may include a generator components adapted to utilize rich gas, delivered directly downstream of a separator module. Additionally or alternatively, the power generation module 331 may comprise a generator adapted to utilize fuel gas that has been processed to such that it is substantially free of propane and higher hydrocarbons (C3+) components.

The fuel gas consumption rate of a given generator refers to the volume of fuel gas consumed by the generator within a given time period. The fuel gas consumption rate may be determined for continuous operation of the generator at standard ambient conditions. Generally, the fuel gas consumption rate of engine-type generators may range from about 40 Mscfd to about 500 Mscfd. And the fuel gas consumption rate of turbine-type generators may range from about 1 MMscfd to about 6 MMscfd.

Electrical output refers to the electrical energy output by a given generator after efficiency losses within the generator. This property is often referred to as "real power" or "kWe." The electrical output may be provided as "continuous power," which refers to the real power obtained from the generator when the module is operating continuously at standard ambient conditions.

Although nearly any generator may be employed in the power generation modules 331, it has been found that generators that produce an electrical output of from about 70 kW to about 30 MW are preferred because these sizes correlate with the quantities of fuel available in a typical application.

Generally, engine-type generators may produce an electrical output ranging from about 70 kW to about 2 MW, with an associated voltage ranging from about 480 V to about 4.16 kV. And turbine-type generators may produce an electrical output ranging from about 2 MW to 30 MW, with an associated voltage ranging from about 4.16 kV to about 12 kV.

It will be appreciated that the various generator components employed in the power generation module 331 may be adapted to operate reliably in harsh oilfield conditions, and with variability in gas rates, composition and heating values. Moreover, it will be appreciated that the specific generator employed in a power generation module 331 may be selected and configured based on the specifications of the raw natural gas and the amount of such raw natural gas that is produced at the wellhead.

As shown, the power generation module 331 may be in further communication with a backup fuel supply 337 containing a backup fuel 308. In one embodiment, the backup fuel supply 337 may comprise a natural gas storage tank containing pressurised natural gas (e.g., received from the natural gas processing system). In another embodiment, the backup fuel supply 337 may comprise an on-site reserve of propane. At times of low wellhead gas pressure, the backup fuel 308 may be piped directly to the generator of the power generation module 331, from the backup fuel supply 337.

In one embodiment, the power generation module 331 may be adapted to automatically switch between the fuel gas 302 and the backup fuel 308. In such embodiments, the generator may utilize fuel gas 302 as long as the pressure and/or flow rate of the fuel gas is greater than or equal to a predetermined value (e.g., from about 20 psig to about 25 psig); and the generator may switch to the backup fuel 308 when the pressure and/or flow rate drops below the predetermined value. It will be appreciated that the fuel switching process may be seamless, resulting in uninterrupted electrical power generation regardless of instantaneous natural gas supply rates.

In one embodiment, the power generation module 331 may comprise various monitoring and control equipment in direct communication with the generator component and in remote communication with the MC system (e.g., via a network). Such equipment may allow for automatic monitoring of operational parameters, including but not limited to, fuel gas supply pressure, fuel gas flow rate, fuel gas characteristics, electrical output (e.g., frequency, voltage, amperage, etc.) and/or emissions. And this configuration may further allow for automatic and/or manual control of the generator, which enables greater reliability and efficiency in remote oilfield locations where human operators are not always present.

Typically, the power generation module 331 will further comprise various ancillary components (commonly referred to as the "balance of plant"). Such components may include, but are not limited to, compressors, lubrication systems, emissions control systems, catalysts, and exhaust systems.

As an example, the power generation module 331 may comprise integrated emissions reduction technologies, such as but not limited to, a non-selective catalytic reduction ("NSCR") system or a selective catalytic reduction ("SCR") system. However, even without employing such emissions technology, the internal combustion process employed by the disclosed embodiments, may significantly reduce emissions of NOx, CO and volatile organic compounds ("VOCs") relative to flaring. For example, an exemplary electrical power generation system 300 that does not include an NSCR or SCR may reduce emissions of such compounds by about 95% or more, as compared to flaring (e.g., at least 95%, at least 96%, at least 97%, at least 98%, or at least 99%).

It will be appreciated that emissions monitoring and control are key permitting requirements in the oilfield. By reducing emissions, the disclosed embodiments help oil and gas operators achieve environmental and regulatory benefits as well as improved community relationships.

In one embodiment, the power generation module 331 may comprise a housing designed to contain and protect the above-described components of the module. Such housing may provide features such as, but not limited to, weatherproofing, skid or trailer mounting for portability, and sound attenuation.

In certain embodiments, the power generation module 331 may be supported by a transportable chassis, trailer, or railcar to facilitate positioning and/or repositioning of the module. More particularly, the transportable chassis, trailers, or railcars may be coupled to vehicles, such as trucks or trains, and transported over a geographic area. The generator skids can range in size from an enclosed trailer hauled behind a pickup truck, to a plurality of semi-trailer loads for the generator and its required ancillary equipment.

As shown, the electrical power generation system 300 further comprises an electrical transformation module 335 in electrical communication with the power generation module 331.

Generally, the electrical power 303 generated by the power generation module 331 may be transmitted through the electrical transformation module 335 such that it may be converted into an electrical flow 305 that is suitable for consumption by computing equipment (e.g., a mobile data center and any number of DCUs of a distributed computing system).

To that end, the electrical transformation module 335 may comprise power conditioning equipment typically including one or more step-down transformers. Such module 335 may be adapted to reduce the voltage of an incoming electrical flow 303 by one or more "steps down" into a secondary electrical flow 305 comprising a lower voltage.

In one embodiment, the electrical transformation module 335 may comprise a 1 MVA step-down transformer adapted to step down the voltage of an incoming electrical flow 303 having a voltage of from about 480 V to about 4.16 kV. In such cases, the electrical transformation module 335 may convert the incoming electrical flow 303 to a reduced-power output electrical flow 305 having a voltage of about 208 V or about 240 V.

Alternatively, when larger turbine-type power generation modules 331 are employed, the electrical transformation module 335 may reduce voltage in a plurality of steps. For example, the electrical transformation module may receive an incoming electrical flow 303 having a voltage of from about 4.16 kV to about 12 kV to and may step down the voltage to about 480 V in a first step. And the module may then further reduce the voltage, via one or more additional steps down, in order to provide a reduced-power output electrical flow 305 having a voltage of about 208 V.

In certain embodiments, the electrical transformer module 335 may also comprise a main breaker capable of cutting off all downstream electrical flows, which allows an operator to quickly de-power any attached computing equipment in the case of operational work or emergency shut-down. Additionally or alternatively, terminals of the electrical transformation module 335 may be fitted with "quick connects," which are pre-terminated inside the module. Such quick connects allow oilfield electricians to quickly connect the electrical transformation module 335 to the power generation module 331 and to a component of the distributed computing system without extensive on-site fabrication and termination work.

In the illustrated embodiment, only one power generation module 331 provides electrical power 303 to the electrical transformation module 335. Accordingly, the power generation module 331 may be directly wired from a terminal of the power generation module 331 into a primary side of the electrical transformation module 335.

Although only one power generation module 331 and one electrical transformation module 335 is shown in FIG. 3, it will be appreciated that any number of such components may be included in the power generation system 300. For example, two or more sets of power generation modules 331 and electrical transformation modules 335 may be employed, in a series configuration, to power any number of computing components (e.g., mobile data centers and DCUs).

Generally, such equipment may be added and/or removed, as required, to consume substantially all available natural gas supply. Moreover, the specific generators employed in the power generation modules 331, the number of such modules, and the configuration of such modules may also be selected with this goal in mind. For example, such equipment may be selected, configured, added to and/or removed from the electrical power generation system 300, as necessary to allow the system to consume at least about 75% (e.g., at least about 80%, at least about 85%, at least about 90%, or at least about 95%) of the natural gas supply. In this way, the system 300 may substantially reduce the amount of natural gas that must be flared during oil production.

Referring to FIG. 4, another exemplary electrical power generation system 400 is illustrated. As shown, the system 400 comprises a plurality of power generation modules (431*a*, 431*b*) in communication with a gas supply line 420 such that they may receive fuel gas 402 therefrom. The power generation modules (431*a*, 431*b*) are also in electrical communication with an electrical transformation module 435 via a parallel panel 460. And, as discussed above, the power generation modules (431*a*, 431*b*) may be in communication with one or more backup fuel supplies 437, such that they may receive backup fuel 408 (e.g., propane) therefrom.

As shown, the electrical power generation system 400 may comprise multiple power generation modules (431*a*, 431*b*) connected in parallel to a single electrical transformation module 435. In such embodiments, the multiple electrical power generation modules (431*a*, 431*b*) may be phase-synced such that their output electrical flows (403*a*, 403*b*) may be combined down-stream without misalignment of wave frequency.

Specifically, the multiple phase-synced electrical flows (403*a*, 403*b*) may be wired into a parallel panel 460, which merges and synchronizes the electrical flows into a single down-stream flow 404 with singular voltage, frequency, current and power metrics. This singular down-stream flow 404 may then be wired into a primary side of an electrical transformation module 435 for voltage modulation. For example, as discussed above, the singular down-stream flow 404 may be transmitted to the electrical transformation module 435 such that the flow may be converted into an output electrical flow 405 that is suitable for consumption by computing equipment (e.g., one or more mobile data centers of a distributed computing system including any number of DCUs).

In such embodiments, each of the power generation modules (431*a*, 431*b*) and/or the parallel panel 460 may comprise a control system that allows for the module to be synchronized and paralleled with other power generation modules. The control system may allow load-sharing of up to 32 power generation modules via a data link and may provide power management capabilities, such as load-dependent starting and stopping, asymmetric load-sharing, and priority selection. Such functionality may allow an operator to optimize load-sharing based on running hours and/or fuel consumption.

Distributed Computing System

Figure 5:
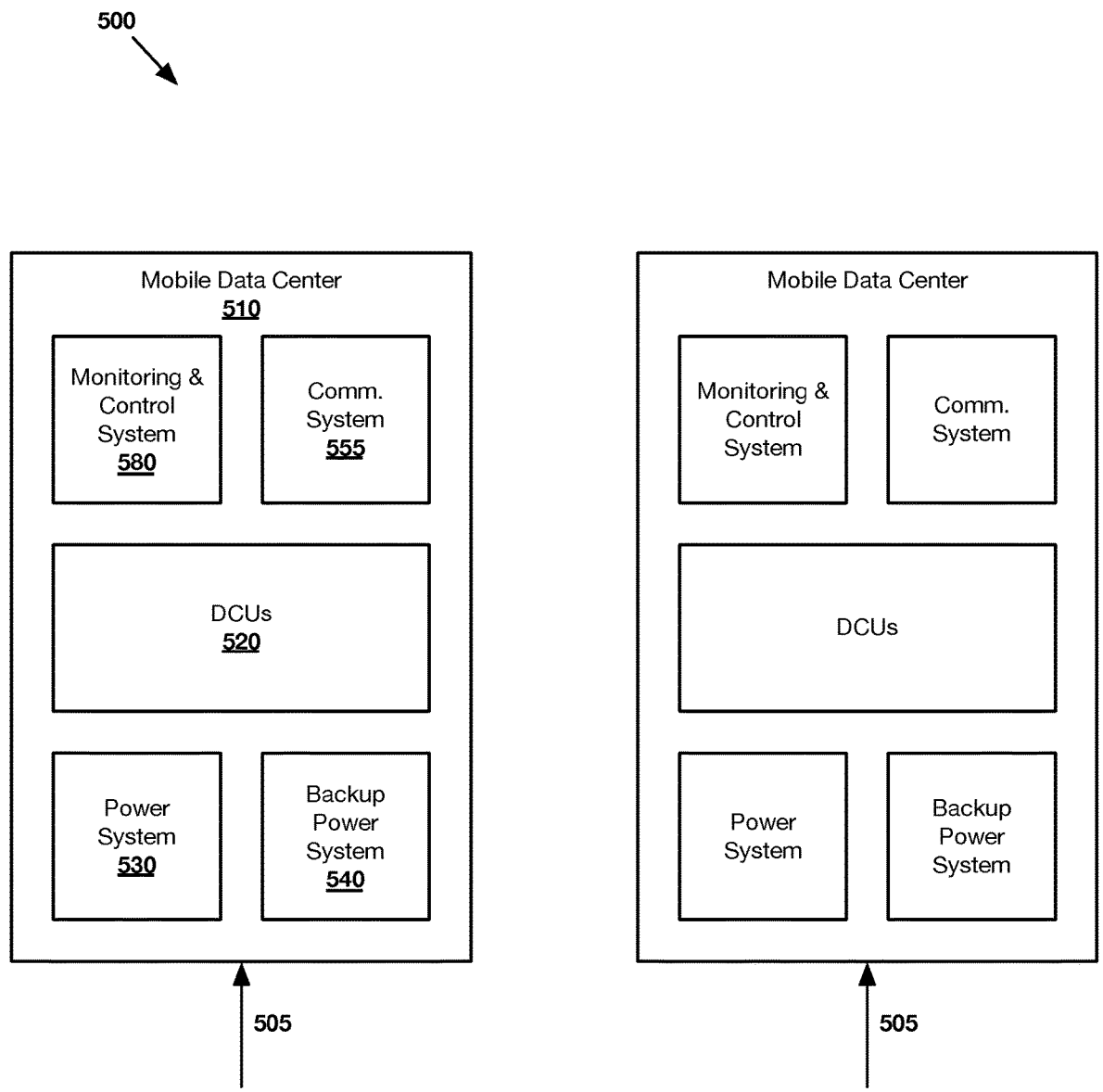
FIG. 5 shows an exemplary distributed computing system 500 according to an embodiment.

Referring to FIG. 5, an exemplary distributed computing system 500 according to an embodiment is illustrated. As shown, the system 500 may include one or more mobile data centers 510 comprising various electrical components, such as but not limited to: any number of DCUs 520, a communications system 555, an electrical power system 530, a backup power system 540, and/or a monitoring and control system 580.

Generally, each of the mobile data centers 510 may comprise a prefabricated housing or enclosure to contain and protect the various electronics. The enclosure may comprise a customized shipping container or other modular housing system designed for portability, durability, safety, stackability, ventilation, weatherproofing, dust control and operation in rugged oilfield conditions.

As shown, each of the mobile data centers 510 may comprise an electrical power system 530 adapted to receive electrical power 505 from an electrical transformation module of an electrical power generation system, as discussed above. More particularly, the power system 530 may receive an output electrical flow 505 from a secondary terminal of an electrical transformation module via cable trays, buried lines and/or overhead suspended lines. In certain embodiments, each mobile data center 510 may be fitted with quick connects (discussed above), which are pre-terminated into the power system 530.

In one embodiment, the electrical power system 530 of a may comprise one or more breaker panels in electrical communication with a series of power distribution units ("PDUs") or power channels. Such PDUs may also be in communication with the various electrical components of the mobile data center 510, such as DCUs 520, backup power systems 540 (e.g., batteries and/or solar panels), a communication system 555, and/or a monitoring and control system 580.

In certain embodiments, the breaker panels and/or PDUs of the power system 530 may be in communication with a monitoring and control system 580 of the mobile data center 510. And such monitoring and control system 580 may be in communication with the remote MC system (FIG. 1 at 180) via a network such that an operator may remotely control (activate and/or deactivate) these components and all electrical equipment in electrical communication therewith. This remote power control feature is important for efficiency and cost reduction in remote oilfield locations, where a human operator may not be present. For example, PDUs may be remotely "power cycled" to reset, reboot or restart malfunctioning equipment without the expense or time required to deploy a human. As another example, breaker panel switches may be remotely controlled to turn on/off power to downstream systems without the need for human dispatch.

As shown, each of the mobile data centers 510 may comprise a plurality of DCUs 520, wherein the DCUs are powered via the power system 530 and, optionally, via the backup power system 540. As discussed above, the DCUs are adapted to conduct any number of processing-intensive tasks, such as but not limited to, graphics-intensive distributed computing processes, server functions, storage, virtual reality and/or augmented reality applications, tasks relating to the Golem Project, non-currency blockchain applications and/or cryptocurrency mining operations.

It will be appreciated that the number of mobile data centers, the number of DCUs contained in each mobile data center, and/or the processing power of such DCUs may be selected to utilize substantially all electrical power generated by the electrical power generation system. Moreover, such equipment may be added and/or removed from the distributed computing system 500, as desired or required, to consume substantially all electrical power generated by the electrical power generation system. For example, the components of the distributed computing system may be selected, configured, added and/or removed, as necessary to allow the system 500 to consume the maximum practical amount of the power generated by the electrical power generation system (typically in excess of 90% of the available power). This allows for revenue generated from distributed computing tasks to be maximized, while also maximizing consumption of produced natural gas via the electrical power generation system.

As discussed above, the mobile data centers 510 and the various electronic components contained there (e.g., DCUs 520, monitoring and control system 580, power system 530 and/or backup power system 540) may be connected to a network via wired or wireless connection to a communication system 555. The communication system 555 may comprise one or more modems, network switches, and network management computers to provide connectivity to the network, such as the Internet, via a fiber optic cable, fixed point wireless (laser, millimeter wave towers, microwave towers or the like used to relay high speed internet on a line-of-sight basis), satellite internet, cell-based internet or any other means of internet connection. And the components of the communication system 555 may be distributed throughout the mobile data center 510 as required to connect all DCUs 520 into the network and to supply sufficient data input and output bandwidth for all connected components.

It will be appreciated that heat and airflow management are important considerations when operating in an oilfield, as outside air temperatures may vary widely from extreme cold to extreme heat. Moreover, excessive dust and precipitation must also be monitored and controlled during oilfield operation. Accordingly, in one embodiment, the monitoring and control system 580 may be adapted to control various parameters of the mobile data center 510, such as temperature, moisture, oxygen, power and/or others.

In one embodiment, the mobile data center 510 may be designed with a cold aisle and a hot aisle. For example, the DCUs 520 may be located within vertically stacked, horizontal racks extending along a row within the mobile data center; and all of the DCUs may be positioned within the racks such that their intake fans point towards the cold aisle, while their exhaust fans point in an opposite direction, towards the hot aisle. It will be appreciated that one or more air inlets of the mobile data center 510 may be aligned with the cold aisle and one or more exhausts of the mobile data center be aligned with the hot aisle.

In one embodiment, the hot and cold aisles may be isolated/separated by employing a faceplate that extends along the row of stacked DCUs 520, adjacent to the exhaust-side thereof. Generally, the faceplate may comprise a metal, plastic, composite, wood or other thin and flat material having a plurality of precut apertures disposed therein. The apertures may be positioned such that each aperture is aligned with an exhaust fan of one of the DCUs. And the apertures may be sized/shaped to complement the size/shape of the DCU exhaust fans, such that each fan substantially fills/covers each aperture and such that each fan may transmit exhaust through one of the apertures. Accordingly, the faceplate forms a physical barrier between gaps in DCU exhaust fans, which helps to ensure that hot air does not recirculate from the hot aisle back to the cold aisle.

The hot aisle may be naturally vented to an exterior of the mobile data center 510, for example, with direct exhaust via one or more exhaust panels or vents. Alternatively, the mobile data center may include a forced air exhaust system, wherein exhaust fans force air out of the hot aisle and exhaust to the exterior. In such embodiments, the exhaust fans may communicate with the monitoring and control system 580 such that the fans may be automatically activated/deactivated as the temperature within the mobile data center increases/decreases.

In another embodiment, the mobile data center 510 may comprise various louvers, dampers, filters and/or awnings designed to protect against direct and wind-blown precipitation, as well as excessive dust intake. In such cases, dampers may be connected to the monitoring and control system 580 such that they may be automatically closed to seal and the mobile data center in the event of a power failure.

It will be appreciated that the mobile data center 510 may be further designed with various safety and security features specific to oilfield operations. For example, the mobile data center 510 may comprise one or more wireless cameras controlled by the monitoring and control system 580 and powered by the power system 530 and/or the backup power system 540. Such cameras may be specified for continuous remote monitoring and/or motion-activated recording. As another example, the mobile data center 510 may comprise may comprise motion activated lighting systems that serve as an additional crime deterrent and/or that may provide sufficient light to facilitate work during nighttime operations.

And as yet another example, the mobile data center 510 may comprise a fire suppression system designed to retard gas and electrical fires. In one embodiment, the monitoring and control system 580 may cause the dampers to automatically seal when extreme temperatures are detected (i.e., to cut off oxygen flow to a fire inside the mobile data center).

Computing Machines

Figure 6:
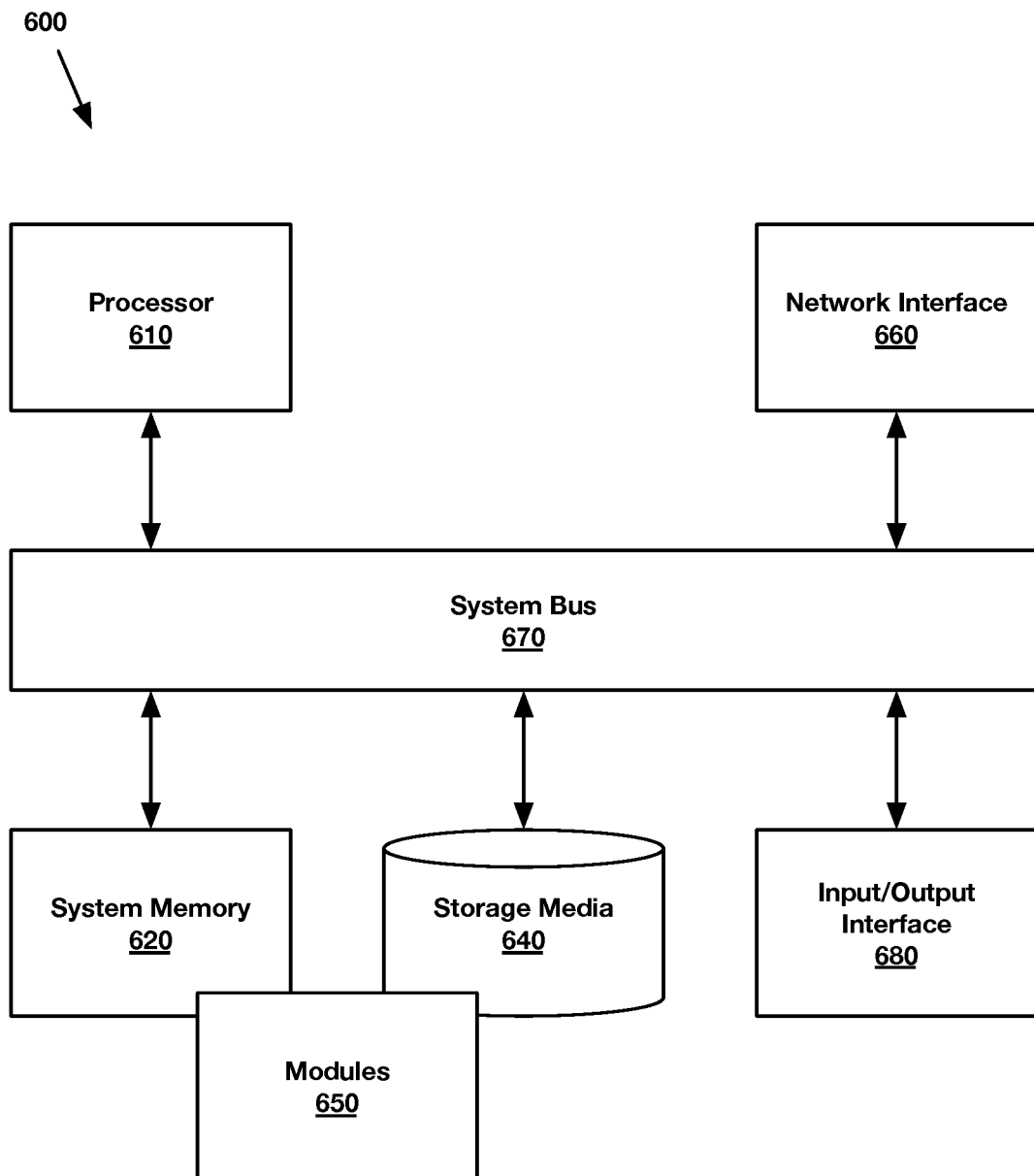
FIG. 6 shows an exemplary computing machine 600 and modules 650 according to an embodiment.

Referring to FIG. 6, a block diagram is provided illustrating an exemplary computing machine 600 and modules 650 in accordance with one or more embodiments presented herein. The computing machine 600 may represent any of the various computing systems discussed herein, such as but not limited to, the DCUs (FIG. 5 at 520), the MC system (FIG. 1 at 180), the client devices (FIG. 1 at 160) and/or the third-party systems (FIG. 1 at 170). And the modules 650 may comprise one or more hardware or software elements configured to facilitate the computing machine 600 in performing the various methods and processing functions presented herein.

The computing machine 600 may comprise all kinds of apparatuses, devices, and machines for processing data, including but not limited to, a programmable processor, a computer, and/or multiple processors or computers. As shown, an exemplary computing machine 600 may include various internal and/or attached components, such as a processor 610, system bus 670, system memory 620, storage media 640, input/output interface 680, and network interface 660 for communicating with a network 630.

The computing machine 600 may be implemented as a conventional computer system, an embedded controller, a server, a laptop, a mobile device, a smartphone, a wearable device, a set-top box, over-the-top content TV ("OTT TV"), Internet Protocol television ("IPTV"), a kiosk, a vehicular information system, one more processors associated with a television, a customized machine, any other hardware platform and/or combinations thereof. Moreover, a computing machine may be embedded in another device, such as but not limited to, a smartphone, a personal digital assistant ("PDA"), a tablet, a mobile audio or video player, a game console, a Global Positioning System ("GPS") receiver, or a portable storage device (e.g., a universal serial bus ("USB") flash drive). In some embodiments, such as the DCUs, the computing machine 600 may be a distributed system configured to function using multiple computing machines interconnected via a data network or system bus 670.

The processor 610 may be configured to execute code or instructions to perform the operations and functionality described herein, manage request flow and address mappings, and to perform calculations and generate commands. The processor 610 may be configured to monitor and control the operation of the components in the computing machine 600. The processor 610 may be a general-purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 610 may be a single processing unit, multiple processing units, a single processing core, multiple processing cores, special purpose processing cores, coprocessors, or any combination thereof. In addition to hardware, exemplary apparatuses may comprise code that creates an execution environment for the computer program (e.g., code that constitutes one or more of: processor firmware, a protocol stack, a database management system, an operating system, and a combination thereof). According to certain embodiments, the processor 610 and/or other components of the computing machine 600 may be a virtualized computing machine executing within one or more other computing machines.

The system memory 620 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 620 also may include volatile memories, such as random-access memory ("RAM"), static random-access memory ("SRAM"), dynamic random-access memory ("DRAM"), and synchronous dynamic random-access memory ("SDRAM"). Other types of RAM also may be used to implement the system memory. The system memory 620 may be implemented using a single memory module or multiple memory modules. While the system memory is depicted as being part of the computing machine 600, one skilled in the art will recognize that the system memory may be separate from the computing machine without departing from the scope of the subject technology. It should also be appreciated that the system memory may include, or operate in conjunction with, a non-volatile storage device such as the storage media 640.

The storage media 640 may include a hard disk, a compact disc read only memory ("CD-ROM"), a digital versatile disc ("DVD"), a Blu-ray disc, a magnetic tape, a flash memory, other non-volatile memory device, a solid-state drive ("SSD"), any magnetic storage device, any optical storage device, any electrical storage device, any semiconductor storage device, any physical-based storage device, any other data storage device, or any combination or multiplicity thereof. The storage media 640 may store one or more operating systems, application programs and program modules such as module, data, or any other information. The storage media may be part of, or connected to, the computing machine 600. The storage media may also be part of one or more other computing machines that are in communication with the computing machine such as servers, database servers, cloud storage, network attached storage, and so forth.

The modules 650 may comprise one or more hardware or software elements configured to facilitate the computing machine 600 with performing the various methods and processing functions presented herein. The modules 650 may include one or more sequences of instructions stored as software or firmware in association with the system memory 620, the storage media 640, or both. The storage media 640 may therefore represent examples of machine or computer readable media on which instructions or code may be stored for execution by the processor. Machine or computer readable media may generally refer to any medium or media used to provide instructions to the processor. Such machine or computer readable media associated with the modules may comprise a computer software product. It should be appreciated that a computer software product comprising the modules may also be associated with one or more processes or methods for delivering the module to the computing machine 600 via the network, any signal-bearing medium, or any other communication or delivery technology. The modules 650 may also comprise hardware circuits or information for configuring hardware circuits such as microcode or configuration information for an FPGA or other PLD.

The input/output ("I/O") interface 680 may be configured to couple to one or more external devices, to receive data from the one or more external devices, and to send data to the one or more external devices. Such external devices along with the various internal devices may also be known as peripheral devices. The I/O interface 680 may include both electrical and physical connections for operably coupling the various peripheral devices to the computing machine 600 or the processor 610. The I/O interface 680 may be configured to communicate data, addresses, and control signals between the peripheral devices, the computing machine, or the processor. The I/O interface 680 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attachment ("ATA"), serial ATA ("SATA"), universal serial bus ("USB"), Thunderbolt, FireWire, various video buses, and the like. The I/O interface may be configured to implement only one interface or bus technology. Alternatively, the I/O interface may be configured to implement multiple interfaces or bus technologies. The I/O interface may be configured as part of, all of, or to operate in conjunction with, the system bus 670. The I/O interface 680 may include one or more buffers for buffering transmissions between one or more external devices, internal devices, the computing machine 600, or the processor 610.

The I/O interface 680 may couple the computing machine 600 to various input devices including mice, touch-screens, scanners, biometric readers, electronic digitizers, sensors, receivers, touchpads, trackballs, cameras, microphones, keyboards, any other pointing devices, or any combinations thereof. When coupled to the computing device, such input devices may receive input from a user in any form, including acoustic, speech, visual, or tactile input.

The I/O interface 680 may couple the computing machine 600 to various output devices such that feedback may be provided to a user via any form of sensory feedback (e.g., visual feedback, auditory feedback, or tactile feedback). For example, a computing machine can interact with a user by sending documents to and receiving documents from a device that is used by the user (e.g., by sending web pages to a web browser on a user's client device in response to requests received from the web browser). Exemplary output devices may include, but are not limited to, displays, speakers, printers, projectors, tactile feedback devices, automation control, robotic components, actuators, motors, fans, solenoids, valves, pumps, transmitters, signal emitters, lights, and so forth. And exemplary displays include, but are not limited to, one or more of: projectors, cathode ray tube ("CRT") monitors, liquid crystal displays ("LCD"), light-emitting diode ("LED") monitors and/or organic light-emitting diode ("OLED") monitors.

Embodiments of the subject matter described in this specification can be implemented in a computing machine 600 that includes one or more of the following components: a backend component (e.g., a data server); a middleware component (e.g., an application server); a frontend component (e.g., a client computer having a graphical user interface ("GUI") and/or a web browser through which a user can interact with an implementation of the subject matter described in this specification); and/or combinations thereof. The components of the system can be interconnected by any form or medium of digital data communication, such as but not limited to, a communication network. Accordingly, the computing machine 600 may operate in a networked environment using logical connections through the network interface 660 to one or more other systems or computing machines across a network.

The processor 610 may be connected to the other elements of the computing machine 600 or the various peripherals discussed herein through the system bus 670. It should be appreciated that the system bus 670 may be within the processor, outside the processor, or both. According to some embodiments, any of the processor 610, the other elements of the computing machine 600, or the various peripherals discussed herein may be integrated into a single device such as a system on chip ("SOC"), system on package ("SOP"), or ASIC device.

EXPERIMENTS

Experiment 1

In a first experiment, a flare mitigation system was deployed at a well site within the Bakken Field. The flare mitigation system included an electrical power generation system having six engine-type power generation modules adapted to receive fuel gas from a fuel gas supply line. Specifically, the system included a first set of power generation modules including two 350 kW engine-type power generation modules and one 225 kW engine-type power generation module; and a second set of power generation modules that also included two 350 kW engine-type power generation modules and one 225 kW engine-type power generation module.

The first set of power generation modules was connected, via a first parallel panel, to a first electrical transformation module comprising a 1 MVA step down transformer. And the second set of power generation modules was connected, via a second parallel panel, to a second electrical transformation module comprising a 1 MVA step down transformer.

The first electrical transformation module received a first input electrical flow from the first parallel panel having a voltage of 480 V and transformed the flow into a first output electrical flow having a voltage of 208 V. The first output electrical flow was then distributed, via diesel locomotive ("DLO") cables on a cable tray, to an electrical power system of a first mobile data center. Specifically, the DLO cables were distributed to a plurality of breaker panels (e.g., 4 or 5) associated with the first mobile data center; each of the breaker panels was in electrical communication with 25 to 35 PDUs; and each of the PDUs was in electrical communication with up to 4 DCUs racked within the first mobile data center. Accordingly the first set of power generation modules was able to support from about 400 DCUs to about 700 DCUs (depending on the number of breaker panels and PDUs employed).

The second electrical transformation module received a second input electrical flow from the second parallel panel having a voltage of 480 V and transformed the flow into a second output electrical flow having a voltage of 208 V. The second output electrical flow was then distributed to up to 700 DCUs contained within a second mobile center, substantially as described above with respect to the first mobile data center.

Each of the first and second mobile data centers measured approximately 40' by 8' by 9.5' (e.g., the size of a High Cube shipping container). Both mobile data centers employed forced air with cold air entering through louvered, screened and filtered intakes on one long axis, and hot air exhausting through louvered and screened fan exhausts on the other long axis.

The above system was found to consume fuel gas at a rate of about 300 Mscfd. The system was further found to generate an electrical output of about 2 MW, wherein substantially all of such electrical output was utilized to power the DCUs contained within the mobile data centers.

Experiment 2

In a second experiment, a flare mitigation system was deployed at a well site within the D-J Basin. The flare mitigation system included an electrical power generation system having three engine-type power generation modules adapted to receive fuel gas from a fuel gas supply line. A first 1.8 MW engine-type power generation module was connected to both a first electrical transformation module and a second electrical transformation module. A second 1.8 MW engine-type power generation module was connected to both a third and a fourth electrical transformation module. And a third 1.8 MW engine-type power generation module was connected to both a fifth and a sixth electrical transformation module.

Each of the first, second, third, fourth, fifth and sixth electrical transformation modules comprised a 1 MVA step-down transformer adapted to receive a 480 V input electrical flow from a respective, connected power generation module and to transform such flow into an output electrical flow having a voltage of 208 V or 240 V. Each of the six electrical transformation modules was also in electrical communication with a separate mobile data center (substantially as described above with respect to Experiment 1), such that a total of six mobile data centers comprising a total of 2,100 DCUs were powered via the three 1.8 MW power generation modules.

The above system was found to consume fuel gas at a rate of about 900 Mscfd. The system was further found to generate an electrical output of about 5.4 MW, wherein substantially all of such electrical output was utilized to power the DCUs contained within the mobile data centers.

Experiment 3

In a third experiment, a flare mitigation system was deployed at a well site within the D-J Basin. The flare mitigation system included an electrical power generation system comprising a 350 kW or 385 kW engine-type power generation module adapted to receive fuel gas from a fuel gas supply line. The power generation module was connected to an electrical transformation module comprising a 0.5 MVA step-down transformer, which transformed a 480 V electrical flow from the generator to a 208 V or 240 V output electrical flow (as described above).

The output electrical flow was then distributed to an electrical power system of a single 20' by 8' by 9.5' mobile data center, which employed power channels (rather than PDUs to support 264 DCUs). For ventilation, the mobile data center utilized natural aspiration via direct exhaust of DCUs to the container's exterior. Specifically, the mobile data center included a pair of awnings and protective walls extending from the air intake (a wall of metal gridding and filtration material on one long axis), as well as the air exhaust wall (a metal grid against which DCU exhaust fans were mounted directly on the other long axis).

The above system was found to consume fuel gas at a rate of about 70 Mscfd to about 80 Mscfd. Moreover, it was found that, in some cases, two paralleled 170 kW engine-type generators could be substituted for a single 350 kW or 385 kW engine-type generator.

Various embodiments are described in this specification, with reference to the detailed discussed above, the accompanying drawings, and the claims. Numerous specific details are described to provide a thorough understanding of various embodiments. However, in certain instances, well-known or conventional details are not described in order to provide a concise discussion. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the embodiments.

The embodiments described and claimed herein and drawings are illustrative and are not to be construed as limiting the embodiments. The subject matter of this specification is not to be limited in scope by the specific examples, as these examples are intended as illustrations of several aspects of the embodiments. Any equivalent examples are intended to be within the scope of the specification. Indeed, various modifications of the disclosed embodiments in addition to those shown and described herein will become apparent to those skilled in the art, and such modifications are also intended to fall within the scope of the appended claims.

It will be understood by those skilled in the art that the drawings are diagrammatic and that further items of equipment such as temperature sensors, pressure sensors, pressure relief valves, control valves, flow controllers, level controllers, holding tanks, storage tanks, and the like may be required in a commercial plant.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

All references including patents, patent applications and publications cited herein are incorporated herein by reference in their entirety and for all purposes to the same extent as if each individual publication or patent or patent application was specifically and individually indicated to be incorporated by reference in its entirety for all purposes.

What is claimed is:

1. A method comprising:
   (a) receiving, by a natural gas processing system, an incoming natural gas stream;
   (b) processing, by the natural gas processing system, the incoming natural gas stream into (i) a primary fuel gas stream comprising a heat value of at least about 1,000 British Thermal Unit per standard cubic foot (Btu/scf), and (ii) a secondary gas stream;
   (c) generating from the primary fuel gas stream, by a power generation system operatively coupled to the natural gas processing system, an electrical output;
   (d) automatically monitoring, by a monitor and control system, a pressure of the primary fuel gas stream; and
   (e) upon determining that the pressure of the primary fuel gas stream is below a predetermined value, causing the power generation system to receive a backup fuel comprising at least a portion of the secondary gas stream and/or a reserve fuel gas.

2. The method of claim 1, wherein the secondary gas stream is stored in a container.

3. The method of claim 1, wherein the predetermined value is from about 20 pounds per square inch gauge (psig) to about 25 psig.

4. The method of claim 1, further comprising increasing, by a compressor module, a pressure of at least one of (a) the incoming natural gas stream, (b) the primary fuel gas stream and (c) the secondary gas stream to thereby produce a respective pressurized stream(s).

5. The method of claim 4, wherein the pressure is increased from an initial pressure of from about 15-50 pounds per square inch (psi), to a final pressure of about 150-350 psi.

6. The method of claim 4, wherein a pressurized secondary gas stream is produced and stored in a container to serve as the backup fuel.

7. The method of claim 4, wherein a pressurized secondary gas stream is produced and the method further comprises cooling, by a refrigeration unit, the secondary gas stream to generate a natural gas liquid (NGL) stream therefrom.

8. The method of claim 7, wherein the primary fuel gas stream comprises a methane content of at least about 80%.

9. The method of claim 1, further comprising removing, by a carbon dioxide removal module of the natural gas processing system, carbon dioxide from the incoming natural gas stream to generate the secondary gas stream.

10. The method of claim 9, wherein the carbon dioxide removal module comprises one or more membranes adapted for selective permeation.

11. The method of claim 9, wherein the secondary gas stream comprises less than about 1% carbon dioxide.

12. The method of claim 1, further comprising removing, by a desulfurization module, sulfur gases from the incoming natural gas stream or the primary fuel gas stream, to generate a desulfurized fuel gas stream.

13. The method of claim 12, wherein the desulfurization module comprises dry sorbents that can capture sulfur gases in solid form.

14. The method of claim 12, wherein the desulfurized fuel gas stream comprises a sulfur content of less than about 0.01 pounds per million standard cubic feet (lbs/Mscf).

15. The method of claim 1, further comprising removing, by a dehydrator module, water from the incoming natural gas stream or the primary fuel gas stream, to generate a respective dehydrated fuel gas stream.

16. The method of claim 15, wherein the dehydrated fuel gas stream comprises a water content of less than about 7 lbs/Mscf.

17. The method of claim 1, further comprising reducing, by a refrigeration module, the temperature of the incoming natural gas stream or the secondary gas stream.

18. The method of claim 17, wherein the refrigeration module reduces a temperature of the respective gas stream via heat exchange with a low temperature fluid.

19. The method of claim 18, wherein the low temperature fluid comprises propane, propylene (C3H6), n-butane, and/or ethylene (C2H4).

20. The method of claim 17, wherein the refrigeration module generates a NGL stream from the respective gas stream.

21. The method of claim 17, wherein the refrigeration module reduces the temperature of the respective gas stream to a target temperature of from about −10° F. to about −32° F.

22. The method of claim 17, wherein the refrigeration module adjusts the pressure of the incoming natural gas stream or the primary fuel gas stream to a target pressure of from about 70 psi to about 510 psi.

23. The method of claim 1, wherein the power generation system comprises a power generation module.

24. The method of claim 23, wherein the power generation module comprises an integrated emissions reduction system.

25. The method of claim 24, wherein the emissions reduction system is adapted to reduce emissions comprising carbon.

26. The method of claim 25, wherein the emissions reduction system employs non-selective catalytic reduction ("NSCR") or selective catalytic reduction ("SCR").

27. The method of claim 1, wherein the power generation system comprises a plurality of power generation modules, each adapted to consume a portion of the primary fuel gas stream to generate a respective electrical output.

28. The method of claim 27, wherein the plurality of power generation modules are parallelized such that the respective electrical outputs are combined to form the electrical output.

29. The method of claim 28, wherein the electrical output is a high-voltage electrical output associated with a first voltage and the method further comprises transforming the high-voltage electrical output into a low-voltage electrical output associated with a second voltage that is lower than the first voltage.

30. The method of claim 1, further comprising powering, by the power generation system, a plurality of distributed computing units.

31. The method of claim 30, further comprising monitoring one or more operational parameters of the power generation system; and upon determining a change in the one or more operational parameters of the power generation system, modulating an electrical load of the plurality of distributed computing units.

* * * * *